US011109315B2

(12) United States Patent
Ljung

(10) Patent No.: US 11,109,315 B2
(45) Date of Patent: Aug. 31, 2021

(54) METHODS FOR ENABLING LOCALIZATION; RELATED ELECTRONIC DEVICES AND RELATED LOCATION SERVER DEVICES

(71) Applicant: Sony Corporation, Tokyo (JP)

(72) Inventor: Rickard Ljung, Helsingborg (SE)

(73) Assignee: Sony Network Communications Europe B.V., Hoofddorp (NL)

(*) Notice: Subject to any disclaimer, the term of this patent is extended or adjusted under 35 U.S.C. 154(b) by 0 days.

(21) Appl. No.: 16/819,060

(22) Filed: Mar. 14, 2020

(65) Prior Publication Data
US 2020/0329432 A1    Oct. 15, 2020

(30) Foreign Application Priority Data

Apr. 11, 2019   (SE) .................................. 1950455-4

(51) Int. Cl.
H04W 24/00    (2009.01)
H04W 52/02    (2009.01)
H04W 64/00    (2009.01)

(52) U.S. Cl.
CPC ....... H04W 52/0229 (2013.01); H04W 64/00 (2013.01)

(58) Field of Classification Search
CPC ....... H04W 4/02; H04W 4/029; H04W 64/00; H04W 36/30; H04W 36/32; G01S 5/02; G01S 5/0249; G01S 5/0295; G01S 5/0246
See application file for complete search history.

(56) References Cited

U.S. PATENT DOCUMENTS

| 9,078,766 B2* | 7/2015 | Dadu .................... H04W 64/00 |
| 9,571,978 B1* | 2/2017 | Ananth ................ G01S 5/0226 |
| 2006/0095349 A1 | 5/2006 | Morgan et al. |
| 2007/0049295 A1 | 3/2007 | Soliman et al. |
| 2007/0155401 A1 | 7/2007 | Ward et al. |

(Continued)

FOREIGN PATENT DOCUMENTS

| CN | 106443575 A | 2/2017 |
| CN | 108235736 A | 6/2018 |
| WO | 2018083610 A1 | 5/2018 |

OTHER PUBLICATIONS

Swedish Search Report for corresponding Swedish Application No. 1950455-4, dated Nov. 26, 2019, 9 pages.

(Continued)

Primary Examiner — Shantell L Heiber
(74) Attorney, Agent, or Firm — Tucker Ellis LLP

(57) ABSTRACT

A location server device includes a memory circuitry, a processor circuitry, and an interface. The location server device is configured to communicate, via the interface, with one or more positioning units configured to communicate with one or more electronic devices one or more first positioning signals at a first frequency. The processor circuitry is configured to select at least one of the one or more positioning units based on detecting a trigger event. The interface is configured to transmit, to the at least one selected positioning unit, an activation signal. The activation signal indicates to the at least one selected positioning unit to activate transmission of one or more second positioning signals at a second frequency that is different from the first frequency.

18 Claims, 11 Drawing Sheets

(56) References Cited

U.S. PATENT DOCUMENTS

| | | | |
|---|---|---|---|
| 2007/0241956 A1* | 10/2007 | Jin | G01S 19/35 |
| | | | 342/357.62 |
| 2010/0120435 A1 | 5/2010 | Mia et al. | |
| 2010/0123435 A1* | 5/2010 | Piazza | H02J 7/0063 |
| | | | 320/128 |
| 2011/0098057 A1* | 4/2011 | Edge | G01S 5/0045 |
| | | | 455/456.1 |
| 2013/0064219 A1* | 3/2013 | Siomina | G01S 5/0236 |
| | | | 370/331 |
| 2013/0267256 A1* | 10/2013 | Yu | H04W 4/029 |
| | | | 455/456.3 |
| 2014/0078973 A1* | 3/2014 | Kazmi | H04W 24/02 |
| | | | 370/329 |
| 2014/0228051 A1* | 8/2014 | Siomina | H04W 8/24 |
| | | | 455/456.1 |
| 2014/0274136 A1 | 9/2014 | Edge et al. | |
| 2014/0295884 A1* | 10/2014 | Racz | H04W 4/023 |
| | | | 455/456.1 |
| 2017/0276761 A1* | 9/2017 | Park | G01S 5/0236 |
| 2017/0363708 A1* | 12/2017 | Thillainadarajah | G01S 5/0252 |
| 2018/0249306 A1 | 8/2018 | Pandharipande | |
| 2018/0262868 A1* | 9/2018 | Edge | H04W 4/029 |
| 2018/0356520 A1 | 12/2018 | Booij et al. | |
| 2019/0082288 A1 | 3/2019 | Kumar et al. | |

OTHER PUBLICATIONS

Extended European Search Report for corresponding European Application No. 20162084.6, dated Sep. 2, 2020, 11 pages.

* cited by examiner

# METHODS FOR ENABLING LOCALIZATION; RELATED ELECTRONIC DEVICES AND RELATED LOCATION SERVER DEVICES

RELATED APPLICATION DATA

This application claims the benefit of Swedish Patent Application No. 1950455-4, filed Apr. 11, 2019, the disclosure of which is incorporated herein by reference in its entirety.

TECHNICAL FIELD

The present disclosure relates to the field of wireless localization. The present disclosure relates to an electronic device configured to enable localization, a location server device and related methods.

BACKGROUND

Wireless positioning services may be constructed on the concept that one or more electronic devices detect positioning signals from one or more positioning units transmitting the positioning signals. For example, the concept of wireless positioning may be used in multiple positioning services, such as Global Positioning System (GPS) (and other satellite positioning systems) and cellular systems (such as 3rd Generation Partnership Project (3GPP), Wideband Code Division Multiple Access (WCDMA), Long Term Evolution (LTE)), but also Wi-Fi and Bluetooth based proprietary systems for indoor navigation for example in smart office solutions. Wireless positioning systems may have the possibility to utilize multiple frequencies for transmission of multiple positioning signals.

However, the use of multiple frequencies for transmission of multiple positioning signals leads to consumption of additional power and spectrum, which may not always be necessary.

SUMMARY

Accordingly, there is a need for electronic devices, positioning units, and location server devices, which mitigate, alleviate or address the shortcomings existing and provides an improved positioning accuracy with a reduced energy consumption and a reduced spectrum usage. This may possibly be achieved at relatively reduced costs.

A location server device is disclosed, the location server device comprising a memory circuitry, a processor circuitry, and an interface. The location server device is configured to communicate, via the interface, with one or more positioning units configured to communicate, with one or more electronic devices, one or more first positioning signals at a first frequency. The processor circuitry may optionally be configured to select at least one of the one or more positioning units based on detecting a trigger event. The interface is configured to transmit, to the at least one selected positioning unit, an activation signal. The activation signal indicates to the at least one selected positioning unit to activate transmission of one or more second positioning signals at a second frequency that is different from the first frequency.

Further, a method performed at a location server device, for enabling localization of an electronic device is provided. The location server device is configured to communicate with one or more positioning units. The one or more positioning units are configured to communicate with one or more electronic devices one or more first positioning signals at a first frequency. The method may optionally comprise selecting at least one of the one or more positioning units based on detecting a triggering event. The method comprises transmitting, to the at least one selected positioning unit, an activation signal. The activation signal indicates to the at least one selected positioning unit to activate transmission of one or more second positioning signals at a second frequency that is different from the first frequency.

The present disclosure provides a computer readable storage medium storing one or more programs, the one or more programs comprising instructions, which when executed by a location server device cause the location server device to perform any of the methods disclosed herein.

It is an advantage of the present disclosure that the location server device determines or estimates the location or positioning of the object to be localized (such as an electronic device) with improved accuracy by activating transmission of one or more first positioning signals and one or more second positioning signals at a different frequency based on a triggering event.

Further, a positioning unit is disclosed, the positioning unit comprising a memory circuitry, a processor circuitry, and an interface. The positioning unit is configured to communicate with a location server device, and with an electronic device. The interface is configured to transmit, to the electronic device, one or more first positioning signals at a first frequency. The interface is configured to detect an activation trigger, wherein the activation trigger indicates to the positioning unit to activate transmission of one or more second positioning signals. The interface is configured to transmit, to the electronic device, the one or more second positioning signals at a second frequency that is different from the first frequency.

Further, a method performed at a positioning unit, for enabling localization of an electronic device is provided. The positioning unit is configured to communicate with a location server device, and with an electronic device. The method comprises transmitting, to the electronic device, one or more first positioning signals at a first frequency. The method comprises detecting an activation trigger, wherein the activation trigger indicates to the positioning unit to activate transmission of one or more second positioning signals. The method comprises transmitting, to the electronic device, the one or more second positioning signals at a second frequency that is different from the first frequency.

The present disclosure provides a computer readable storage medium storing one or more programs, the one or more programs comprising instructions, which when executed by a positioning unit cause the positioning unit to perform any of the methods disclosed herein.

It is an advantage of the present disclosure that the positioning unit is configured to transmit one or more first positioning signals and one or more second positioning signals at different frequencies to facilitate determination or estimation of the location of the object (such as an electronic device) to localize with improved accuracy. For example, providing multiple positioning signals at different frequencies and suitable occasions for activating the second positioning signal at the positioning unit permits achieving a high positioning accuracy of the object with a lower energy consumption and a reduced spectrum usage.

Further, an electronic device is disclosed, the electronic device comprising a memory circuitry, a processor circuitry, and a wireless interface. The electronic device is configured to communicate with one or more positioning units and optionally with a location server device. The wireless interface is configured to receive, from the one or more positioning units, one or more first positioning signals at a first frequency. The processor circuitry is configured to activate a receiver circuitry of the wireless interface for reception of the one or more second positioning signals at a second frequency different from the first frequency. The wireless interface is configured to receive, from the one or more positioning units, the one or more second positioning signals at the second frequency.

Further, a method performed at an electronic device, for localization of the electronic device is provided. The electronic device is configured to communicate with one or more positioning units, and optionally with a location server device. The method comprises receiving, from the one or more positioning units, one or more first positioning signals at a first frequency. The method comprises activating a receiver of the electronic device for reception of the one or more second positioning signals at a second frequency different from the first frequency. The method comprises receiving, from the one or more positioning units, the one or more second positioning signals at the second frequency.

The present disclosure provides a computer readable storage medium storing one or more programs, the one or more programs comprising instructions, which when executed by an electronic device cause the electronic device to perform any of the methods disclosed herein.

It is an advantage of the present disclosure that the electronic device configured to receive positioning signals at different frequencies. Providing multiple positioning signals at different frequencies and determining suitable occasions for activating the electronic device leads to a high positioning accuracy of the electronic device while reducing energy consumption at the electronic device.

BRIEF DESCRIPTION OF THE DRAWINGS

The above and other features and advantages of the present disclosure will become readily apparent to those skilled in the art by the following detailed description of example embodiments thereof with reference to the attached drawings, in which.

DETAILED DESCRIPTION

Figure 1A:
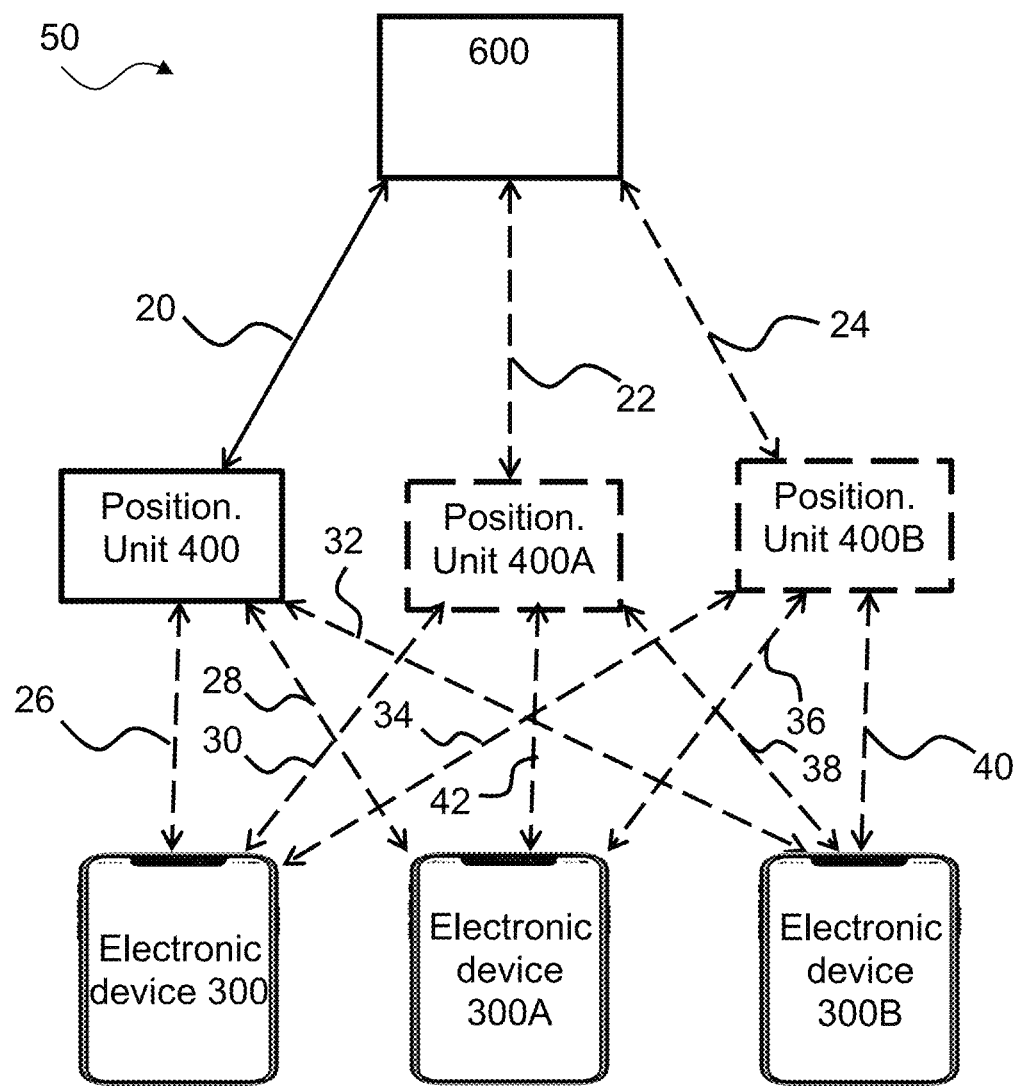
FIG. 1A is a diagram illustrating an example positioning system comprising an example location server device and an example electronic device according to this disclosure.

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

Wireless positioning systems may have the possibility to utilize multiple frequencies for transmission of multiple positioning signals. For example, in certain scenarios (for example using the Wi-Fi and cellular systems), it may be possible to use even higher frequencies when transmitting positioning signals (such as mm-Wave frequencies (such as 30 GHz or 60 GHz)). For example, since the attenuation of a positioning signal through a wall may be significantly different for positioning signals (or Radiofrequency (RF) signals) in the mm-Wave frequency range compared to positioning signals in the 2-3 GHz range, positioning signals may be transmitted with higher frequency for achieving a high positioning accuracy. The attenuation of a positioning signal through a wall is larger for positioning signals with mm-Wave frequencies compared to positioning signals at lower frequencies. This is used to determine specifically a localization with improved accuracy.

However, properties of high frequency positioning signals (RF signals) may also be different from positioning signals at a lower frequency from other perspectives, for example the need to use beam forming in a transmitter and a receiver to achieve relatively good spatial coverage due to the high general path loss. Thereby, there may be a potential need to transmit and receive multiple positioning signals (for example beams) to achieve an omnidirectional coverage. Alternatively, there may be a need for a larger amount of spectrum resources by using additional frequencies.

Use of multiple frequencies in general consumes additional energy in both positioning units (for example transmitter) and electronic device (for example receiver), which may decrease battery lifetime in case the electronic devices are battery powered. Hence, although high accuracy of the positioning may be provided, there may be an impact of frequent usage of positioning signals in multiple frequencies on the battery life of devices and the spectrum usage.

Further, when positioning signals with multiple frequencies for increased accuracy and robustness in positioning are used all the time, this results in a suboptimal use of both energy and spectrum capacity.

The present disclosure provides multiple positioning signals at different frequencies and allows determining suitable occasions for activating these positioning signals. This leads to a high positioning accuracy of the electronic device while reducing energy consumption at the corresponding device, and the spectrum usage.

Since the higher accuracy frequency can be used specifically to determine positioning of devices (for example in indoor locations or in outdoor locations, for example to determine whether a device is inside a specific room in a building or not), the activation may be triggered by detecting an event (for example by utilizing door openings or other triggers indicative of changes in the population in a room).

FIG. 1A is a diagram illustrating an example positioning system 50 comprising an example location server device 600 and an example electronic device 300, 300A, 300B according to this disclosure.

The positioning system 50 may comprise positioning units 400, 400A, 400B. A positioning unit 400, 400A, 400B may refer to a device capable of communication with the electronic device 300, 300A, 300B to support positioning estimation. Examples of positioning units 400, 400A, 400B comprise observer devices, gateway devices, transmitter devices, and/or receiver devices.

The location server device 600 may be configured to communicate with one or more positioning units 400, 400A, 400B via links 20, 22, 24 comprising a wireless links (for example a radio link, Wi-Fi link and/or Bluetooth link), and/or via a wired link. The position (such as the location) of the positioning units may be known by the positioning service (such as by a location server device 600) and the electronic device is to be localized in one or more example embodiments.

In one or more example embodiments, the position (such as the location) of the electronic device may be known by the positioning service (such as by a location server device 600) and the positioning unit is to be localized.

The electronic devices 300, 300A, 300B may refer to for example mobile devices and/or a user equipment, UE, and/or IoT devices. The electronic device may in one or more example embodiments be attached to an object that needs to be positioned via localization of the attached electronic device. The object may for example be a machine, a cargo in a transportation/logistics system etc.

The positioning units 400, 400A, 400B may be configured to communicate with each of the electronic devices 300, 300A, 300B via wireless links 26, 28, 30, 32, 34, 36, 38, 40, 42. The one or more positioning units 400, 400A, 400B are configured to communicate with one or more electronic devices 300 one or more first positioning signals at a first frequency (such as used in GPS, cellular systems, Wi-Fi and/or Bluetooth). The first frequency may be in a first frequency band.

The location server device 600 may be configured to select at least one of the one or more positioning units 400, 400A, 400B based on detecting a trigger event, and configured to transmit, to the at least one selected positioning unit 400, 400A, 400B, an activation signal via the links 20, 22, 24, where the activation signal indicates to the selected positioning unit 400, 400A, 400B to activate transmission of one or more second positioning signals at a second frequency different from the first frequency. For example, the second frequency may be part of a second frequency band that is different from the first frequency band of the first frequency. The utilized activation signal composition as determined by its communication protocol may for example be the same for the two frequencies, or it may be different signal compositions for the two frequencies. Examples of such signal composition that may or may not be the same for the two signals and may be related to but is not limited to the signal frame structure, a bit sequence, a modulation scheme, a coding scheme, a frequency hopping scheme and a channel access regulation scheme.

The electronic devices 300, 300A, 300B may be configured to receive, from the one or more positioning units 400, 400A, 400B, one or more positioning signals via wireless links 26, 28, 30, 32, 34, 36, 38, 40, 42. The electronic devices 300, 300A, 300B may be configured to receive, from the location server device 600, an activation signal, where the activation signal indicates to the electronic devices 300, 300A, 300B to activate reception of one or more positioning signals (such as one or more second positioning signals).

Figure 1B:
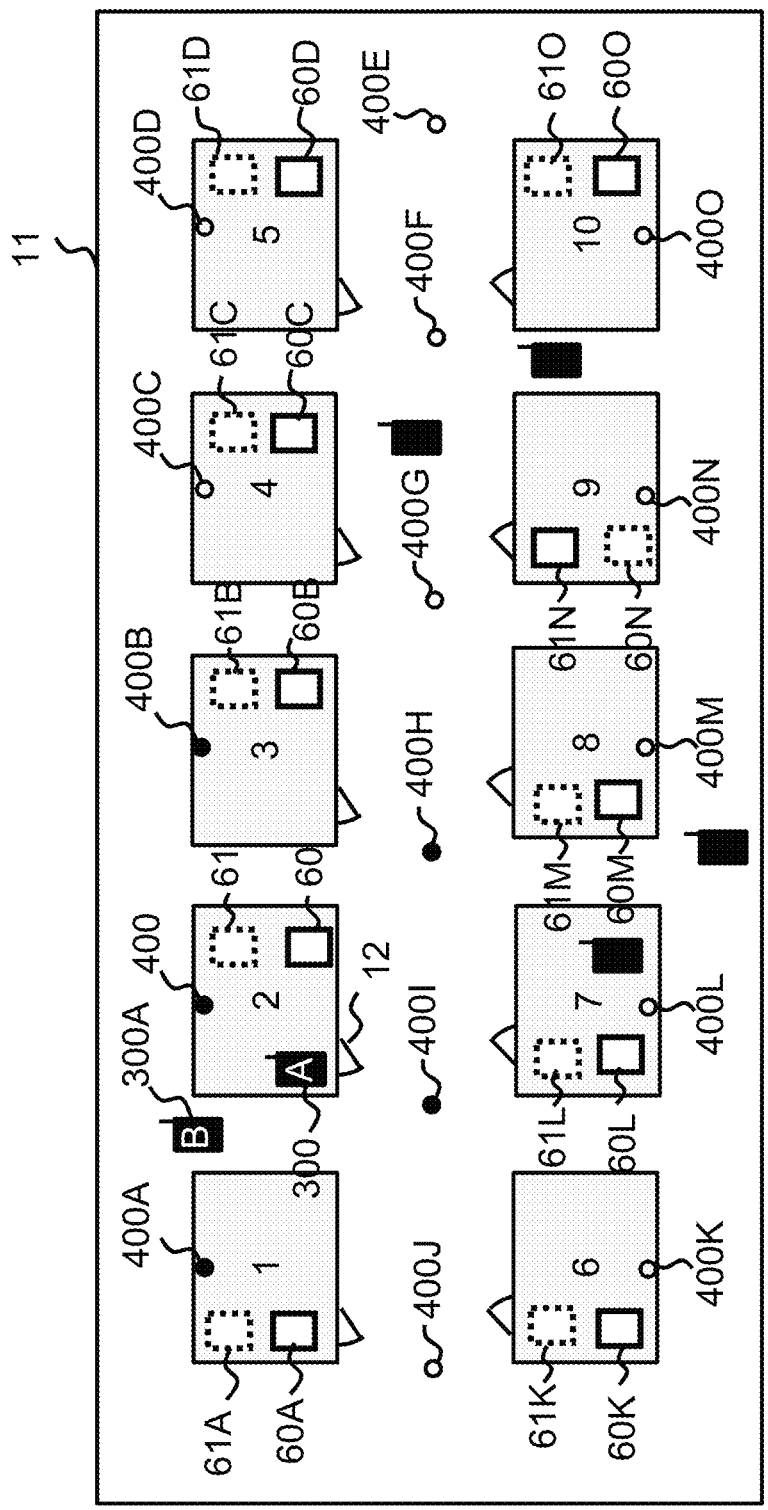
FIG. 1B is a diagram illustrating example electronic devices and example positioning units in a space according to this disclosure.

FIG. 1B is a diagram illustrating example electronic devices 300, 300A and example positioning units 400, 400A-400O in a space 11 according to this disclosure.

The space 11 may be an indoor space, for example a building, such as a warehouse, a hospital, an office. The space 11 comprises one or more rooms or spaces enclosed from the remaining space 11 by for example walls.

The present disclosure may be applicable to an outdoor space (such as an outdoor warehouse, such as a harbour area for logistics tracking) in one or more embodiments.

The space 11 comprises multiple rooms 1-10. For example, the space 11 may be an office building, and the rooms 1-10 may be office rooms or meeting rooms each enclosed by walls and may comprise a door 12 for entering the room 1-10. For example, the space 11 may be a hospital, and the rooms 1-10 may be wards each enclosed by walls and may comprise a door 12 for entering the room 1-10.

An electronic device 300 may be located inside a room 2 in the space 11. An electronic device 300A may be located outside the rooms 1-10 in the space 11.

A positioning unit 400, 400A-400D, 400K-400O may be arranged in one or more rooms 1-10. A positioning unit 400E-400J may be arranged in the space 11 outside of one or more rooms 1-10.

One or more sensors 60, 61, 60A-60O, 61A-61O may be arranged in one or more of the rooms 1-10 located in the space 11. The one or more sensors 60, 61, 60A-60O, 61A-61O are configured to detect a trigger event. Detecting a trigger event may comprise detecting movement in proximity of at least one of the positioning units 400, 400A-400O. The one or more sensors 60, 61, 60A-60O, 61A-61O may be configured to obtain sensor data indicative of presence information and/or movement within proximity of at least one of the positioning units 400, 400A-400O, and may be configured to transmit the sensor data to the location service device 600, optionally, via the one or more positioning units 400, 400A-400O.

Example of sensors include a motion sensor, sound detection sensor, an air pressure difference detector, an Infrared (IR) detector, an electric door lock mechanism, and/or a magnetic field sensor.

The positioning units 400, 400A-400O may be configured to communicate with a location server device 600. The positioning units 400, 400A-400O may be configured to transmit, to the electronic device 300, 300A, one or more first positioning signals at a first frequency.

The location server device 600 may be configured to select at least one of the one or more positioning units 400, 400A-400O based on the detected trigger event. The location server device 600 may be configured to transmit, to the at least one selected positioning unit 400, 400A-400O, an activation signal, wherein the activation signal indicates to the selected positioning unit 400, 400A-400O to activate transmission, to the electronic device 300, 300A, one or more second positioning signals at a second frequency that is different from the first frequency.

Figure 1C:
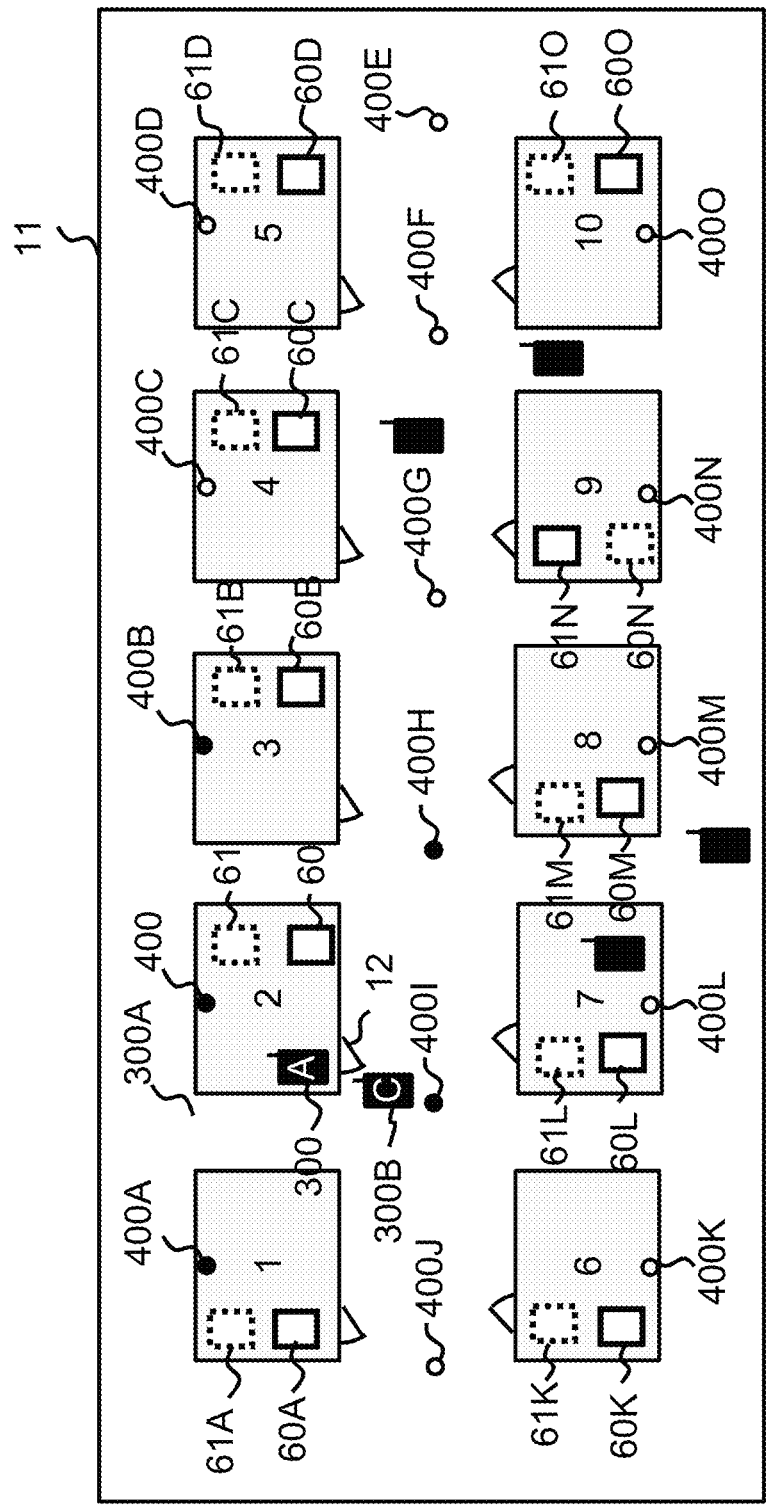
FIG. 1C is a diagram illustrating example electronic devices and example positioning units in a space according to this disclosure.

FIG. 1C is a diagram illustrating example electronic devices 300, 300B and example positioning units 400, 400A-400O in a space 11 according to this disclosure.

As in FIG. 1B, FIG. 1C illustrates a space 11 which may comprise multiple rooms 1-10, positioning units 400, 400A-400D, 400K-400O arranged in each of the rooms 1-10, and positioning units 400E-400J arranged in the space 11 outside of the rooms 1-10.

An electronic device 300 may be arranged inside a room 2 in the space 11. An electronic device 300B may be arranged outside the rooms 1-10 in the space 11, outside the door 12 of the room 2.

For example, when the sensors 60, 61 of the room 2 detects a trigger event, it may be uncertain whether the detection is caused by an electronic device 300 moving around inside the room 2, an electronic device 300 has entered the room 2, an electronic device 300B has left the room 2, or an electronic device 300B has passed by the room 2, leading to false positive determinations of the electronic device 300B being in the room 2.

By providing positioning units 400, 400A-400O configured to transmit, to the electronic device 300, 300B, one or more first positioning signals at a first frequency and one or more second positioning signals at a second frequency that is different from the first frequency, the location server device is capable of improved positioning accuracy of the electronic device, such as by determining an accurate position with respect to the door 12. For example, attenuation of a positioning signal through a wall (such as, the wall of the room 2) is significantly larger for the second positioning signals (such as over mm-Wave frequencies) compared to positioning signals at lower frequencies. For example, this is used to determine specifically whether the electronic device 300, 300B to be positioned has entered or left the room 2 in the space 11.

For example, since the difference in frequencies or in frequency bands can be used specifically to determine positioning of electronic devices 300, 300B in spaces, for example whether an electronic device 300, 300B is inside a specific room in an space 11 or not, the present disclosure proposes in one or more example embodiments to detect the trigger by exploiting sensor data from the one or more sensors capable of detecting presence and/or movement (such as door opening sensors or other sensor capable of detecting changes in the population in a room) as a trigger to activate the second positioning signal(s) with use of different frequencies or frequency bands.

Figure 2:
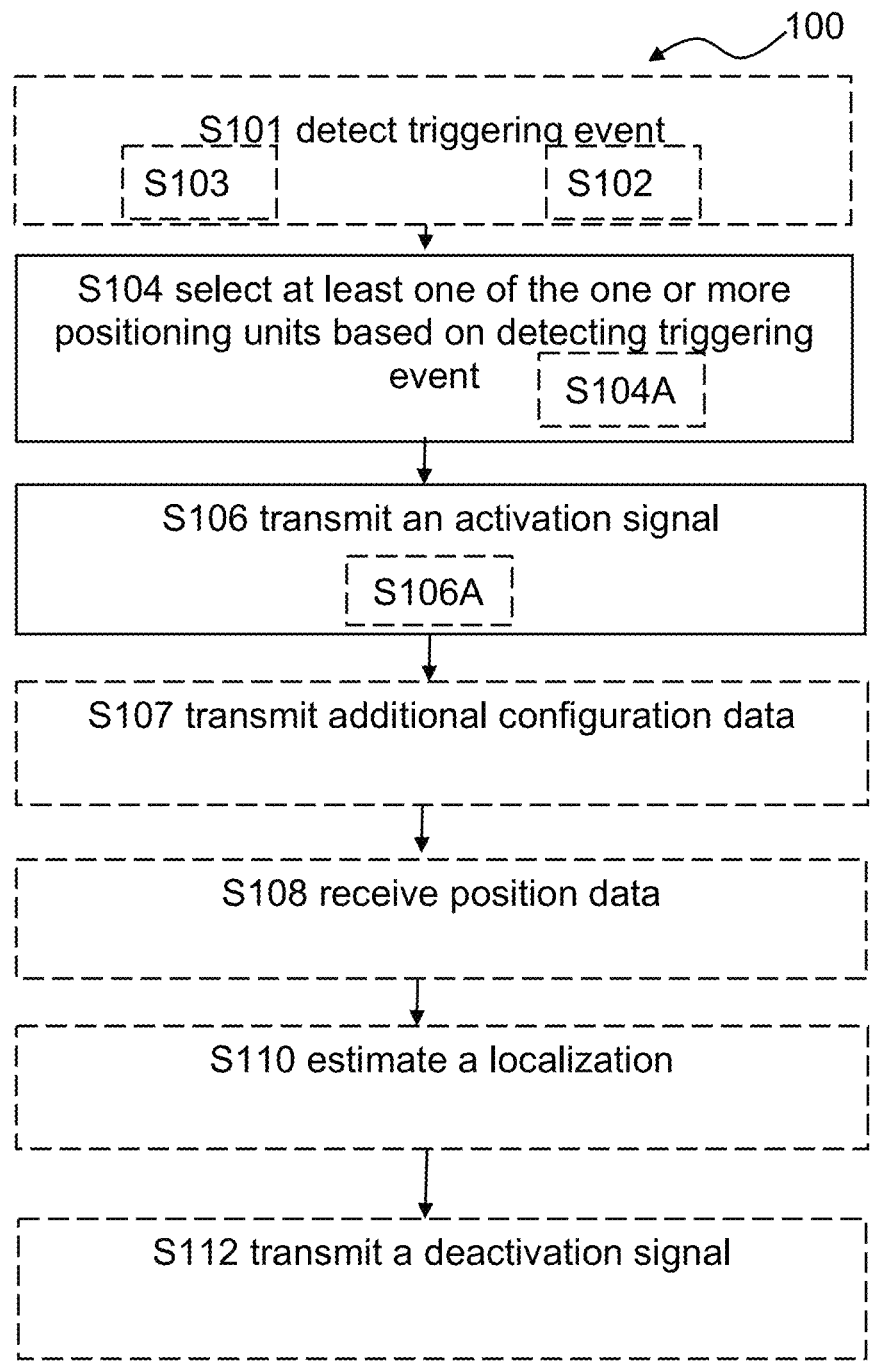
FIG. 2 is a flow-chart illustrating an example method, performed at a location server device, for enabling localization of an electronic device according to this disclosure.

FIG. 2 is a flow-chart illustrating an example method, performed at a location server device 600, for enabling localization of an electronic device 300 according to this disclosure.

The method 100 is performed by a location server device, for enabling localization of an electronic device (for example for supporting localization of an electronic device). For example, the localization of the electronic device, in other words, provides a tracking solution for localizing the electronic device in a space (for example in a space enclosed by walls, for example in a building).

The location server device is configured to communicate with one or more positioning units. The one or more positioning units are configured to communicate, with one or more electronic devices, one or more first positioning signals at a first frequency (such as the first frequency of a first frequency band). For example, one or more positioning units are configured to transmit and/or receive one or more first positioning signals at a first frequency. For example, a first frequency band may be a GPS band, a cellular system band, a Wi-Fi band, and/or a Bluetooth band.

The method 100 comprises selecting S104 at least one of the one or more positioning units based on detecting S101 a triggering event.

In one or more example methods, detecting S101 the trigger event may comprise receiving S102 from a sensor, sensor data indicative of presence information within proximity of at least one of the selected positioning units. For example, the sensor data may indicate whether an electronic device 300 is present in an area. For example, the sensor data may indicate movement near the selected positioning units 400. For example, a triggering event may be based on data from an air pressure difference detector, an Infrared (IR) detector, sound detection, an electric door lock mechanism, a magnetic field sensor or similar, transmitted to the location server device 600 (for example via one or more positioning units 400).

In one or more example methods, detecting S101 the trigger event may comprise detecting S103 that an accuracy parameter of the estimated localization does not satisfy an accuracy criterion based on a threshold. For example, the accuracy parameter does not satisfy the accuracy criterion when the accuracy parameter is below a threshold. For example, the accuracy parameter is below a threshold when the location server device detects that too few electronic devices detect the first positioning signal. For example, the accuracy parameter is below a threshold when the quality of the receptions from the first positioning signal is too low.

For example, the accuracy parameter does not satisfy the accuracy criterion when the accuracy parameter is above a variation threshold, and/or when the variations of the positions estimated is higher than threshold (such as too high (indicative of large speed of the tracked electronic device and/or a bad accuracy of the calculations)).

For example, stated differently, a triggering event may be based on sensor data (for example information) from a sensor transmitted to the location server device 600 (for example via one or more positioning units 400). A triggering event may be based on a need to improve the location accuracy of an electronic device, for example due to a sensor activated which indicates that there may be a possibility that a new electronic device has entered a geographic area in proximity of the sensor. A triggering event may be based on the location server device 600 having not received a positioning signal from the electronic device 300 for period of time or cannot accurately determine the location of the electronic device 300.

The method 100 comprises transmitting S106, to the at least one selected positioning unit, an activation signal. The activation signal indicates to the at least one selected positioning unit to activate transmission of one or more second positioning signals at a second frequency that is different from the first frequency.

In one or more example methods, the second frequency may be higher than the first frequency.

For example, the second frequency may be part of a second frequency band that is different from the first frequency band. In one or more example methods, the second frequency band may be higher than the first frequency band. For example, the second frequency band may comprise high accuracy positioning signal (HAPS) positioning signals. HAPS may comprise RF positioning signals.

For example, one or more positioning units may be configured to transmit the one or more first positioning signals and the one or more second positioning signals simultaneously. Alternatively, one or more positioning units may be configured to transmit the one or more first positioning signals prior to or after transmitting the one or more second positioning signals.

For example, after detecting a trigger event, the location server device 600 transmits an activation signal to one or more selected positioning units 400 to activate transmission of one or more second positioning signals. The selection of suitable positioning units 400 to transmit the second positioning signal may be done for example by selecting positioning units 400 within close proximity to the area (for example a room in the space 11 of FIGS. 1B-1C) where the trigger event has occurred. The second positioning signal may be transmitted by the positioning unit 400 in the form of a predetermined bit sequence which can be detected by an electronic device 300 (for example by a receiver within the electronic device 300) to be positioned. The second positioning signal may be an RF signal. RF signals may be used in for example Bluetooth technology (known as Bluetooth positioning beacons) or in 3GPP systems (known as positioning reference signals). The positioning units 400 may be configured to transmit the second positioning signal according to predetermined requirements. Accordingly, the positioning units 400 may be configured to transmit the second positioning signal for example on a certain transmit frequency (for example 10000 kHz), with a certain repetition periodicity (for example repeat every 100 ms), a certain transmit power (for example 10 dBm), and/or a certain time duration (for example 1 ms) of each positioning signal.

For example, the first positioning signal and/or the second positioning signal may comprise information indicative of the identity of the transmitting positioning unit (for example to an electronic device to be positioned). Having pre-knowledge of the position of the positioning unit, helps to identify the position of the electronic device.

In other words, the present disclosure provides in one or more example embodiments, activation of a transmission of a second positioning signals at a second frequency when a trigger event occurs that indicates a need for high location accuracy and a comparison of the second positioning signals with the first positioning signals in the location server device.

In one or more example methods, the method 100 may comprise determining a trigger event (for example from a sensor, such as a motion detector). The trigger event is used to activate one or more positioning units to transmit one or more second positioning signals at a second frequency, and optionally further to activate an electronic device to receive the one or more second positioning signals. This enables to compare for example the signal strength of the second positioning signal with the signal strength of a first positioning signal at a first frequency (such as a first frequency of a first frequency band). This may advantageously lead to an improvement the location accuracy of the electronic device.

For example, stated differently, the determination of a location of an electronic device may be performed by receiving and analysing one or more second positioning signals at a second frequency (e.g. of a second frequency band) and optionally with other information. The other information comprises the one or more first positioning signal at a first frequency (e.g. of a first frequency band). The one or more first positioning signals may for example be both transmitted by positioning units (for example by transmit units used in the positioning service) and received by the electronic device with a lower energy consumption than the one or more second positioning signals. Alternatively, or additionally, the first positioning signals may be transmitted on a lower frequency or with other means achieving a wider and/or improved spatial coverage than the second positioning signals.

In one or more example methods, the method 100 may comprise receiving S108, from the electronic device, position data, the position data indicative of one or more path loss estimates of the one or more second positioning signals received at the electronic device and/or one or more signal strength metrics of the one or more second positioning signals received at the electronic device.

In one or more example methods, the position data may be indicative of a localization of the electronic device. For example, the electronic device may be configured to compare the second positioning signals strengths with the received one or more first positioning signals strengths. The signal strengths of the first positioning signals and of the second positioning signals can be used to estimate the path loss of the positioning signals between the positioning units and the electronic device.

In one or more example methods, the method 100 comprises estimating S110 a localization of the electronic device based on the received position data. In one or more example methods, estimating S110 a localization of the electronic device based on the received position data may be performed by comparing path loss estimates and/or the received signal strength metrics.

In one or more example methods, the method 100 may comprise transmitting S107 to the one or more positioning units 400, additional configuration data for adjusting transmission of the one or more second positioning signals at the one or more positioning units.

In one or more example methods, configuration data may comprise increasing signal strength or activating more positioning units when the one or more second positioning signals has not been received at the electronic device which leads to continuing transmission of second positioning signals for example based on a timer.

In one or more example methods, selecting S104 at least one of the one or more positioning units based on detecting S101 a triggering event comprises selecting S104A at least one of the one or more positioning units based on information from the at least one of the one or more sensor devices.

In one or more example methods, the method 100 comprises transmitting S112 a deactivation signal to the at least one selected positioning unit, wherein the deactivation signal indicates to the at least one selected positioning unit to deactivate the transmission of the one or more second positioning signals.

For example, the positioning units may be configured to repeat the transmission of positioning signals during a certain time period (for example repeat every 10 seconds), or to continue repetition of the transmission of positioning signals until the positioning units receives a deactivation signal from the location server device.

In one or more example methods, the second frequency may be in a frequency range above 3 GHz. In one or more example methods, the second frequency may be in a frequency range above 30 GHz. In one or more example methods, the second frequency may be in a frequency range of 60 GHz. In one or more example methods, the second frequency may be a millimetre wave frequency band.

In one or more example methods, the second frequency band may be in a frequency range above 3 GHz. In one or more example methods, the second frequency band may be in a frequency range above 30 GHz. In one or more example methods, the second frequency band may be in a frequency range of 60 GHz. In one or more example methods, the second frequency band may be a millimetre wave frequency band.

In one or more example methods, the location server device may be configured to communicate with a detection sub-system comprising one or more sensors located in a space, and one or more positioning units.

In one or more example methods, the activation signal comprises configuration data for configuring transmission of the one or more second positioning signals at the one or more positioning units. In one or more example methods, configuration data may comprise output power, frequency, periodicity, and/or repetition information.

In one or more example methods, transmitting S106, to the at least one selected positioning unit, the activation signal may comprise transmitting S106A, to the electronic device, the activation signal.

Figure 3:
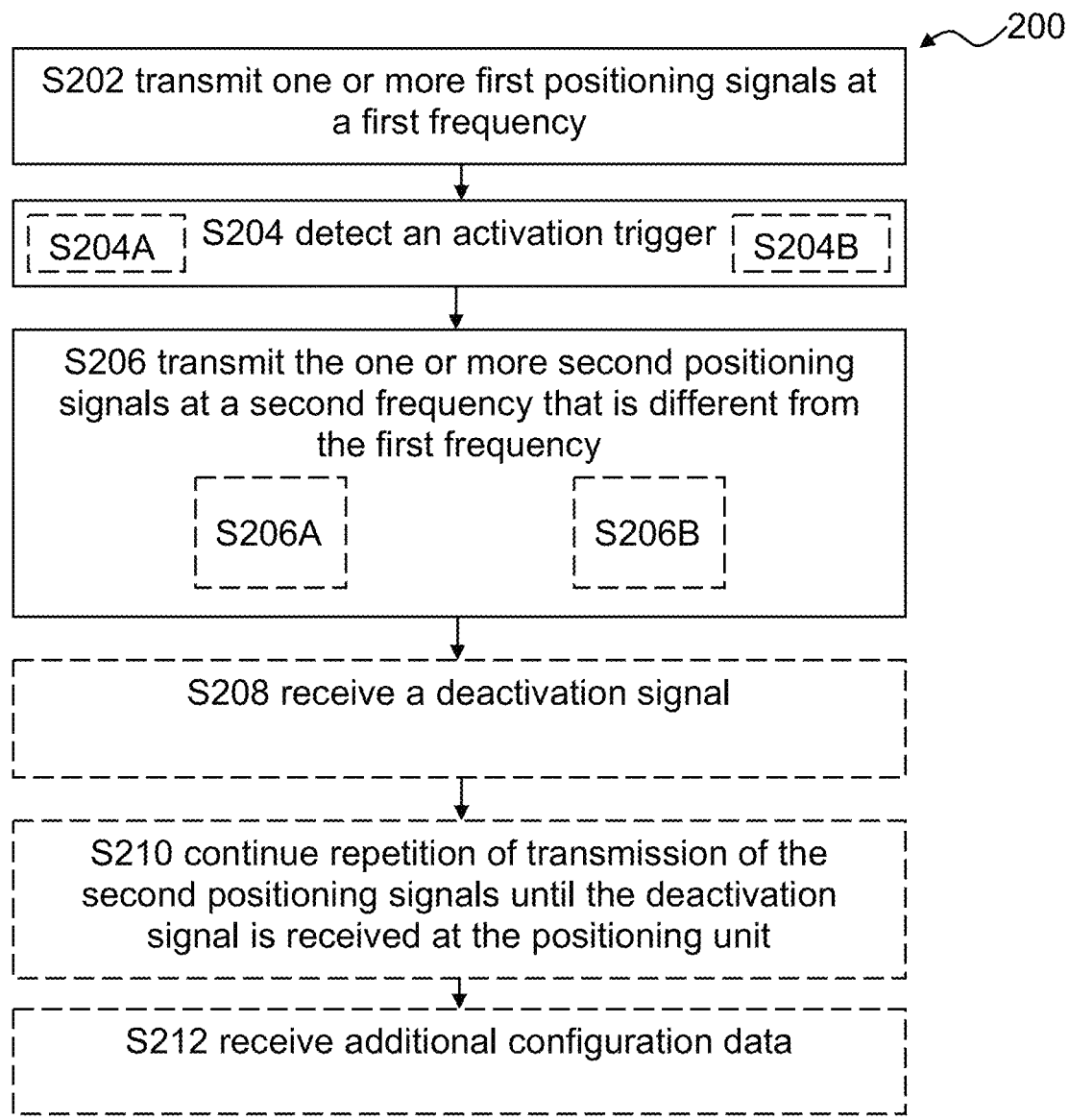
FIG. 3 is a flow-chart illustrating an example method, performed at a positioning unit, for enabling localization of an electronic device according to this disclosure.

FIG. 3 is a flow-chart illustrating an example method, performed at a positioning unit, for enabling localization of an electronic device according to this disclosure.

The method 200 is performed by a positioning unit, for enabling localization of an electronic device. The positioning unit is located in a space (such as indoor space or outdoor space) and is configured to communicate with a location server device, and with an electronic device. The positioning unit may support in localizing the electronic device in one or more embodiments.

The method 200 comprises transmitting S202, to the electronic device, one or more first positioning signals at a first frequency (optionally of a first frequency band).

The method 200 comprises detecting S204 an activation trigger. The activation trigger indicates to the positioning unit to activate transmission of one or more second positioning signals (at a second frequency that is different from the first frequency). The second frequency may optionally be part of a second frequency band different from the first frequency band. Detecting the activation trigger may be from a sensor coupled with the positioning unit.

In one or more example methods, detecting S204 the activation trigger comprises receiving S204A, from the location server device, an activation signal.

In one or more example methods, detecting S204 the activation trigger comprises receiving 5204B from a sensor, sensor data indicative of presence information within proximity of the positioning unit. For example, the activation trigger detection is determined based on the sensor data. For example, the sensor data may indicate whether an electronic device 300 is present in an area. For example, the sensor data may indicate movement near the selected positioning units 400.

The method 200 comprises transmitting S206, to the electronic device, the one or more second positioning signals at a second frequency that is different from the first frequency. In one or more example methods, the second frequency is higher than the first frequency. For example, the second frequency may be part of a second frequency band different from the first frequency band (optionally higher than the first frequency band).

In one or more example methods, transmitting S206, to the electronic device, the one or more second positioning signals may comprise selecting 5206A one or more of transmission parameters. In one or more example methods, the one or more transmission parameters may comprise a transmit frequency (optionally in the second frequency band), a repetition periodicity of the transmission, a transmit power, and/or a time duration of the transmission. In one or more example methods, the positioning units may be configured to repeat the transmission during a certain time period (for example repeat for every 10 seconds).

In one or more example methods, transmitting 206, to the electronic device, the one or more second positioning signals may comprise transmitting 5206B the one or more second positioning signals according to the selected one or more transmission parameters.

In one or more example methods, the second positioning signal may comprise a positioning unit identifier indicative of an identity of the positioning unit transmitting the second positioning signal. The position unit identifier allows to distinguish the various positioning units from one another.

In one or more example methods, the method 200 may comprise receiving S208, from the location server device, a deactivation signal indicating to the selected positioning unit to deactivate the transmission of the one or more second positioning signals.

In one or more example methods, the method 200 may comprise continuing S210 repetition of transmission of the second positioning signals until the deactivation signal is received at the positioning unit.

In one or more example methods, the method 200 comprises receiving S212, from the location server device, additional configuration data for adjusting transmission of the one or more second positioning signals at the one or more positioning units.

Figure 4:
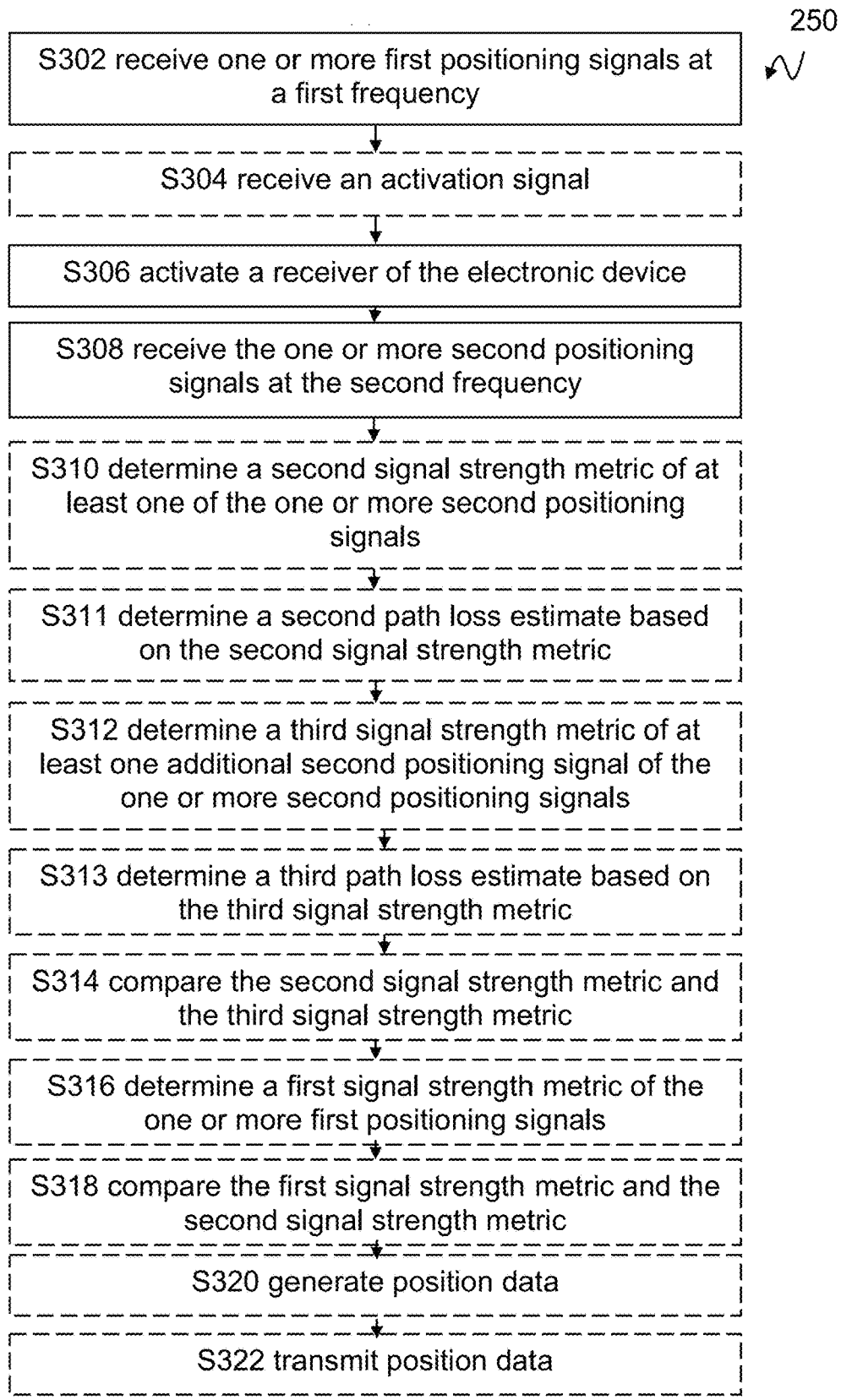
FIG. 4 is a flow-chart illustrating an example method, performed at an electronic device, for localization of the electronic device according to this disclosure.

FIG. 4 is a flow-chart illustrating an example method 250, performed at an electronic device, for localization of the electronic device according to this disclosure.

The method 250 is performed by an electronic device, for supporting localization of the electronic device. The electronic device is configured to communicate with one or more positioning units, and with a location server device.

The method 250 comprises receiving S302, from the one or more positioning units, one or more first positioning signals at a first frequency (optionally of a first frequency band).

The method 250 comprises activating S306 a receiver of the electronic device for reception of the one or more second positioning signals at the second frequency (optionally of the second frequency band).

The method 250 comprises receiving S308, from the one or more positioning units, the one or more second positioning signals at the second frequency.

The method 250 may comprise receiving S304, from the location server device, an activation signal. The activation signal indicates to the electronic device to activate reception of one or more second positioning signals at a second frequency that is different from the first frequency (optionally the second frequency may be part of a second frequency band different from a first frequency band of the first frequency). The processor circuitry 302 is configured to activate S306 the receiver circuitry 303A for reception of the one or more second positioning signals based on the received activation signal. The method may comprise activating the receiver circuitry for reception of the one or more second positioning signals periodically.

The method may comprise activating the receiver circuitry for reception of the one or more second positioning signals based on sensor data coupled with the electronic device.

The method may include that the electronic device may be configured to activate the reception of one or more second positioning signals based on other information than a reception of an activation signal. The electronic device may periodically activate the reception of one or more second positioning signals. The electronic device may be equipped with or connected to one or more sensors, which information may be triggering an activation of a reception of a second positioning signal.

For example, the electronic device to be located may be configured to periodically listen for one or more second positioning signals in addition to one or more first positioning signals.

The method may comprise activating the receiver circuitry for reception of the one or more second positioning signals based on the position data not satisfying an accuracy criterion. For example, detecting the trigger event may comprise detecting that an accuracy parameter of an estimated localization does not satisfy an accuracy criterion based on a threshold. In one or more examples, the accuracy parameter does not satisfy the accuracy criterion when the accuracy parameter is below a threshold. For example, the accuracy parameter is below a threshold when the quality of the receptions from the first positioning signal is too low. For example, the accuracy parameter does not satisfy the accuracy criterion when the accuracy parameter is above a variation threshold, when the variations of the positions estimated is too high (indicative of large speed of the tracked device and/or poor accuracy of the calculations).

In one or more embodiments, the electronic device receives an activation signal from the location server device to activate reception of a second positioning signal. An activation signal may be triggered by a trigger event, for example by a motion detection. The activation signal may include configuration information.

In one or more example methods, the method 250 may comprise determining S310 a second signal strength metric of at least one of the one or more second positioning signals. In one or more example methods, the second signal strength metric may comprise a received signal strength indicator, RSSI.

In one or more example methods, the method 250 may comprise determining S312 a third signal strength metric of at least one additional second positioning signal of the one or more second positioning signals.

In one or more example methods, the method 250 may comprise comparing S314 the second signal strength metric and the third signal strength metric.

For example, the electronic device may be capable of receiving two or more second positioning signals and determine the individual signal strength differences between the different received second positioning signals.

In one or more example methods, the method 250 may comprise determining S311 a second path loss estimate based on the second signal strength metric.

In one or more example methods, the method 250 may comprise determining S313 a third path loss estimate based on the third signal strength metric.

In one or more example methods, the method 250 may comprise determining S316 a first signal strength metric of the one or more first positioning signals.

In one or more example methods, the method 250 may comprise comparing S318 the first signal strength metric and the second signal strength metric.

For example, the electronic device may be configured to receive second positioning signals in addition to first positioning signals and to determine the signal strength of the second positioning signals and compare them with the first positioning signals.

In one or more example methods, the method 250 can comprise generating S320 position data based on the comparison. For example, there may be multiple mathematical functions which can be used to generate the position data (such as to estimate the location of the electronic device) and suitable functions may depend on the positioning units configurations, for example whether each positioning unit transmits the second positioning signal or not. For example, in a case where each positioning unit transmits both first positioning signals and second positioning signals, and where the positioning units use the same output power, the signal strength metric of a first positioning signal may be denoted RSSI_first_x and the signal strength metric of a second positioning signal received from the positioning unit x may be denoted as RSSI_second_x. A method to determine which positioning unit among K positioning units that received the second positioning signals is the closest to the electronic device may be performed by for example calculating:

$$\min(\text{abs}(\text{RSSI\_first\_i} - \text{RSSI\_second\_i}))$$

where i=[1 . . . K] is the identity of the K different positioning units.

One or more advanced mathematical formulas may be used to estimate for example the distance between the positioning units and the electronic device based on the absolute values of the RSSI. Further, path loss can be estimated even with different output powers from different positioning signals, by a compensation added to the signal strength metrics. The calculations may be performed for example within the electronic device and/or further the RSSI(s) transmitted to the location server device for position estimation. Alternatively, the electronic device may transmit the signal strength metrics and positioning unit identities to the location server device for location determination. Once location of the electronic device is determined based on the received second positioning signal, the location server device may de-activate the transmission of the second positioning signal and the reception of the second positioning signal.

In one or more example methods, the method 250 can comprise transmitting S322 the position data. For example, the electronic device may transmit the position data to the location server device, for example via the positioning units.

Figure 5:
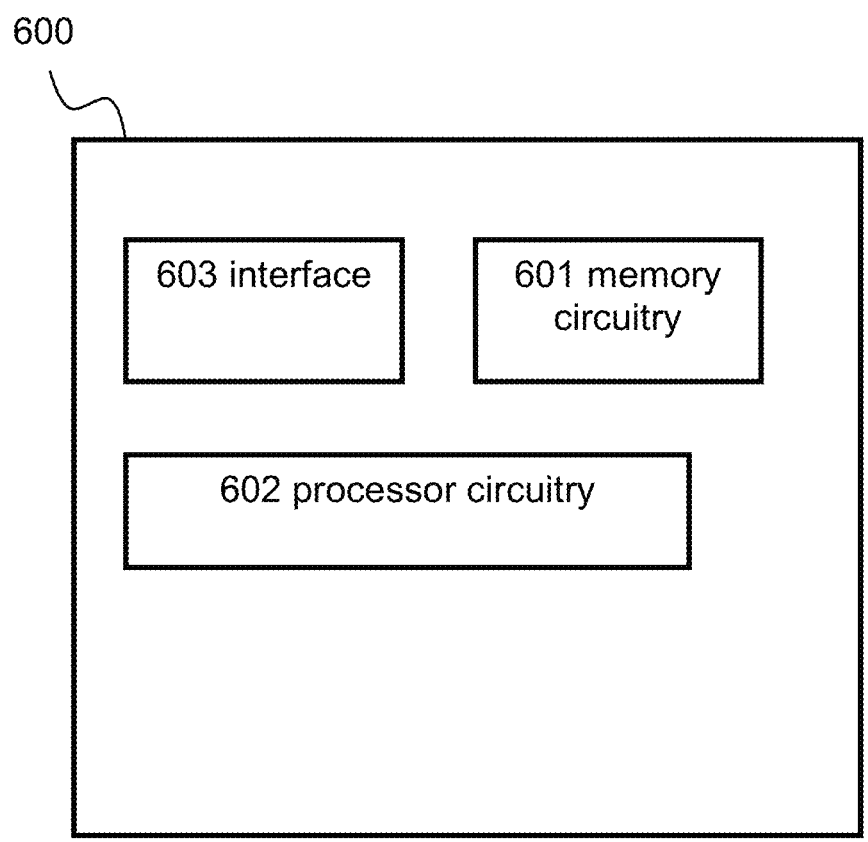
FIG. 5 is a block diagram illustrating an example location server device according to this disclosure.

FIG. 5 is a block diagram illustrating an example location server device 600 according to this disclosure.

The location server device 600 comprises a memory circuitry 601, a processor circuitry 602, and an interface 603.

The location server device 600 is configured to communicate, via the interface 603, with one or more positioning units 400 configured to communicate with one or more electronic devices 300 one or more first positioning signals at a first frequency (for example of a first frequency band, for example: GPS band, cellular band, Wi-Fi band, and/or Bluetooth band).

The processor circuitry 602 is configured to select at least one of the one or more positioning units 400 based on detecting a trigger event.

The interface 603 is configured to transmit, using the interface 603, to the at least one selected positioning unit 400, an activation signal.

The activation signal indicates to the at least one selected positioning unit 400 to activate transmission of one or more second positioning signals at a second frequency that is different from the first frequency (optionally the second frequency of a second frequency band that is different from the first frequency band).

In one or more example location server devices, the second frequency may be higher than the first frequency. The second positioning signals may be transmitted in the same time slot as the first positioning signals.

In one or more example location server devices, the second frequency band may be higher than the first frequency band. The second positioning signals may be transmitted in the same time slot as the first positioning signals.

In one or more example location server devices, the location server is configured to detect the trigger event by receiving from a sensor, sensor data indicative of presence information within proximity of at least one of the selected positioning units 400. For example, the sensor data may indicate whether an electronic device 300 is present in an area. For example, the sensor data may indicate movement near the selected positioning units 400. In one or more example location server devices, detecting the trigger event may comprise detecting that an accuracy parameter of the estimated localization does not satisfy an accuracy criterion based on a threshold. In one or more example location server devices, the accuracy parameter does not satisfy the accuracy criterion when the accuracy parameter is below a threshold. For example, the accuracy parameter is below a threshold when the location server device 600 detects that too few electronic devices 300 detect the first positioning signal. For example, the accuracy parameter is below a threshold when the quality of the receptions from the first positioning signal is too low. For example, the accuracy parameter does not satisfy the accuracy criterion when the accuracy parameter is above a variation threshold, when the variations of the positions estimated is too high (indicative of large speed of the tracked device and/or bad accuracy of the calculations).

In one or more example location server devices, the interface 603 may be configured to receive, from the electronic device 300, position data, the position data indicative of one or more path loss estimates of the one or more second positioning signals received at the electronic device 300 and/or one or more signal strength metrics of the one or more second positioning signals received at the electronic device 300. For example, the position data may comprise one or more path loss estimates of the one or more second positioning signals received at the electronic device and/or one or more signal strength metrics of the one or more second positioning signals received at the electronic device. In one or more example location server devices, the position data may be indicative of a localization of the electronic device 300.

In one or more example location server devices, the processor circuitry 602 may be configured to estimate, a localization of the electronic device 300 based on the received position data.

In one or more example location server devices, the processor circuitry 602 may be configured to estimate a localization of the electronic device 300 based on the received position data by comparing the path loss estimates and/or the received signal strength metrics.

In one or more example location server devices, the processor circuitry 602 may be configured to transmit, via the interface 603, to the one or more positioning units 400, additional configuration data for adjusting transmission of the one or more second positioning signals at the one or more positioning units 400. In one or more example location server devices, configuration data may comprise increasing signal strength or activating more positioning units when the second positioning signal has not been received at the electronic device 300 which leads to continuing transmission of second positioning signals for example based on a timer.

In one or more example location server devices, the processor circuitry 602 is configured to select at least one of the one or more positioning units 400 based on detecting a trigger event by selecting at least one of the one or more positioning units based on information from the at least one of the one or more sensors.

In one or more example location server devices, the interface 603 may be configured to transmit a deactivation signal to the at least one selected positioning unit 400.

In one or more example location server devices, the deactivation signal indicates to the at least one selected positioning unit 400 to deactivate the transmission of the one or more second positioning signals.

In one or more example location server devices, the second frequency may be in a frequency range above 3 GHz. In one or more example location server devices, the second frequency may be in a frequency range above 30 GHz. In one or more example location server devices, the second frequency may be in a frequency range of 60 GHz. In one or more example location server devices, the second frequency may be a millimetre wave frequency band.

In one or more example location server devices, the second frequency band may be in a frequency range above 3 GHz. In one or more example location server devices, the second frequency band may be in a frequency range above 30 GHz. In one or more example location server devices, the second frequency band may be in a frequency range of 60 GHz. In one or more example location server devices, the second frequency band may be a millimetre wave frequency band.

In one or more example location server devices, the location server device 600 may be configured to communicate with a detection sub-system comprising one or more sensors located in proximity of the one or more positioning units and/or electronic device, and one or more positioning units 400.

In one or more example location server devices, the activation signal may comprise configuration data for configuring transmission of the one or more second positioning signals at the one or more positioning units 400.

In one or more example location server devices, the interface 603 may be configured to transmit, to the electronic device 300, the activation signal.

The location server device 600 is optionally configured to perform any of the operations disclosed in FIG. 2 (for example S101, S102, S103, S104, S106, S107, S108, S110, S112).

The operations of the location server device 600 may be embodied in the form of executable logic routines (for example, lines of code, software programs, etc.) that are stored on a non-transitory computer readable medium (for example, the memory circuitry 601) and are executed by the processor circuitry 602).

Furthermore, the operations of the location server device 600 may be considered a method that the location server device 600 is configured to carry out. Also, while the described functions and operations may be implemented in software, such functionality may as well be carried out via dedicated hardware or firmware, or some combination of hardware, firmware and/or software.

The memory circuitry 601 may be one or more of a buffer, a flash memory, a hard drive, a removable media, a volatile memory, a non-volatile memory, a random access memory (RAM), or other suitable device. In a typical arrangement, the memory circuitry 601 may include a non-volatile memory for long term data storage and a volatile memory that functions as system memory for the processor circuitry 602. The memory circuitry 601 may exchange data with the processor circuitry 602 over a data bus. Control lines and an address bus between the memory circuitry 601 and the processor circuitry 602 also may be present (not shown in FIG. 5). The memory circuitry 601 is considered a non-transitory computer readable medium.

Figure 6:
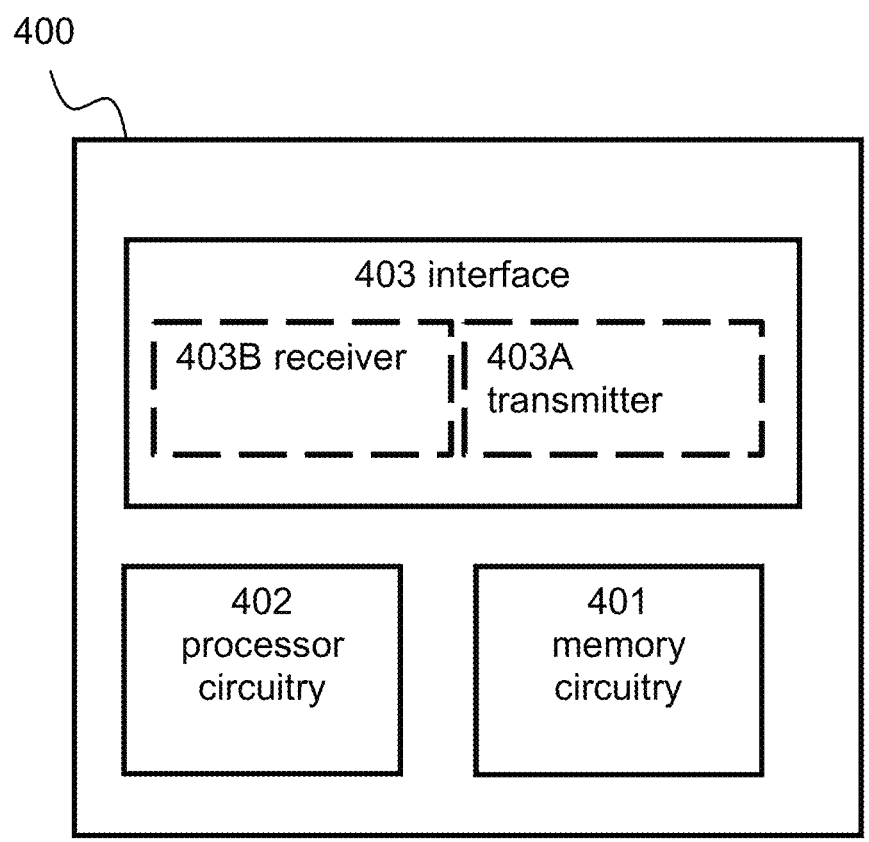
FIG. 6 is a block diagram illustrating an example positioning unit according to this disclosure.

FIG. 6 is a block diagram illustrating an example positioning unit according to this disclosure. The positioning unit 400 comprises a memory circuitry 401, a processor circuitry 402, and an interface 403. The positioning unit 400 is configured to enable localization of an electronic device. The positioning unit 400 may be located in an indoor space or an outdoor space. The positioning unit 400 is configured to communicate with a location server device 600, and with an electronic device 300.

The interface 403 is configured to transmit, to the electronic device 300, one or more first positioning signals at a first frequency (optionally of a first frequency band).

The interface 403 is configured to receive, from the location server device 600, an activation signal, wherein the activation signal indicates to the positioning unit to activate transmission of one or more second positioning signals.

The interface 403 is configured to transmit, to the electronic device 300, the one or more second positioning signals at a second frequency of a second frequency that is different from the first frequency (optionally a second frequency of a second frequency band that is different from the first frequency band).

In one or more example positioning units, the second frequency may be higher than the first frequency.

In one or more example positioning units, the second frequency band may be higher than the first frequency band.

In one or more example positioning units, the positioning unit may be configured to transmit, by using the interface 403, to the electronic device 300, the one or more second positioning signals by selecting one or more of transmission parameters. The transmission parameters may comprise a transmit frequency (optionally in the second frequency band), a repetition periodicity of the transmission, a transmit power, and/or a time duration of the transmission.

In one or more example positioning units, the positioning units may be configured to repeat the transmission during a certain time period (for example repeat for 10 seconds).

In one or more example positioning units, the positioning unit may be configured to transmit, to the electronic device 300, the one or more second positioning signals by transmitting the one or more second positioning signals according to the selected one or more transmission parameters.

In one or more example positioning units, the second positioning signal may comprise a positioning unit identifier indicative of an identity of the positioning unit 400 transmitting the second positioning signal.

In one or more example positioning units, the interface 403 may be configured to receive, from the location server device 600, a deactivation signal indicating to the selected positioning unit 400 to deactivate the transmission of the one or more second positioning signals.

In one or more example positioning units, the positioning unit 400 may be configured to continue repetition of transmission of the second positioning signals until the deactivation signal is received at the positioning unit 400.

In one or more example positioning units, the interface 403 may be configured to receive, from the location server device 600, additional configuration data for adjusting transmission of the one or more second positioning signals at the one or more positioning units 400.

The positioning unit 400 is optionally configured to perform any of the steps or operations disclosed in FIG. 3 (for example S202, S204, S206, S206A, 5206B, S208, S210, S212). The operations of the positioning unit 400 may be embodied in the form of executable logic routines (for example, lines of code, software programs, etc.) that are stored on a non-transitory computer readable medium (for example, the memory circuitry 401) and are executed by the processor circuitry 402).

Furthermore, the operations of the positioning unit 400 may be considered a method that the positioning unit 400 is configured to carry out. Also, while the described functions and operations may be implemented in software, such functionality may as well be carried out via dedicated hardware or firmware, or some combination of hardware, firmware and/or software.

The memory circuitry 401 may be one or more of a buffer, a flash memory, a hard drive, a removable media, a volatile memory, a non-volatile memory, a random access memory (RAM), or other suitable device. In a typical arrangement, the memory circuitry 401 may include a non-volatile memory for long term data storage and a volatile memory that functions as system memory for the processor circuitry 402. The memory circuitry 401 may exchange data with the processor circuitry 402 over a data bus. Control lines and an address bus between the memory circuitry 401 and the processor circuitry 402 also may be present (not shown in FIG. 6). The memory circuitry 401 is considered a non-transitory computer readable medium.

Figure 7:
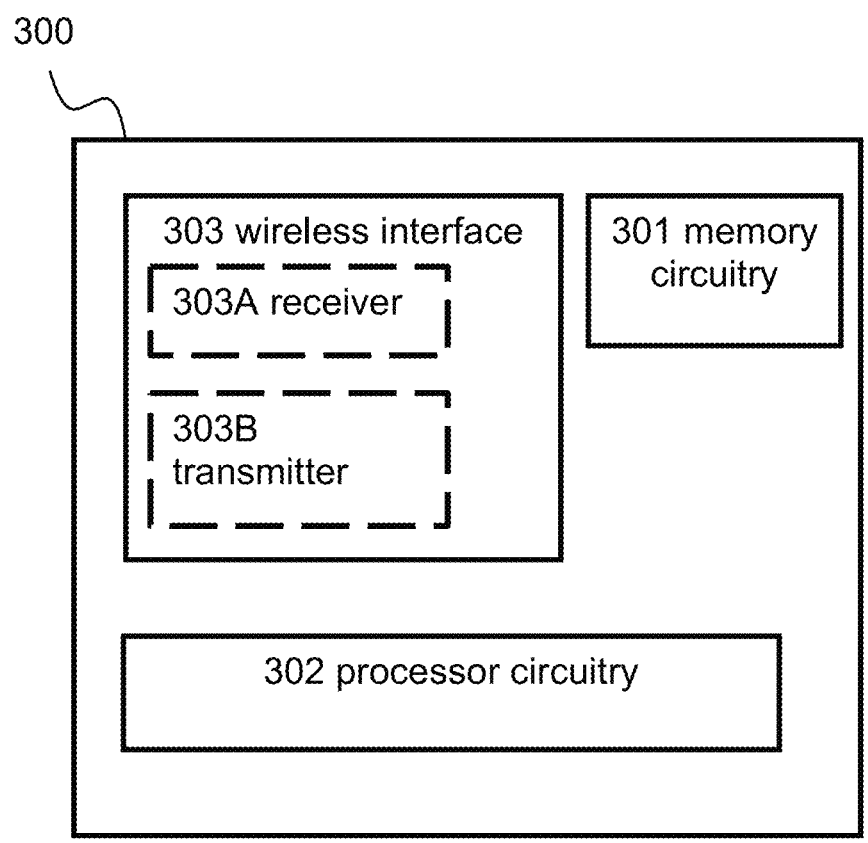
FIG. 7 is a block diagram illustrating an example electronic device according to this disclosure.

FIG. 7 is a block diagram illustrating an example electronic device according to this disclosure. The electronic device 300 comprises a memory circuitry 301, a processor circuitry 302, and a wireless interface 303. The electronic device 300 is configured to communicate with one or more positioning units 400, and optionally with a location server device 600.

The wireless interface 303 is configured to receive, by using a receiver circuitry 303A, from the one or more positioning units 400, one or more first positioning signals at a first frequency (optionally of a first frequency band).

The wireless interface 303 may be configured to receive, by using a receiver circuitry 303A, from the location server device 600, an activation signal. The activation signal indicates to the electronic device 300 to activate reception of one or more second positioning signals at a second frequency that is different from the first frequency (optionally a second frequency of a second frequency band that is different from the first frequency band).

The processor circuitry 302 is configured to activate a receiver circuitry 303A of the wireless interface 603 for reception of the one or more second positioning signals at the second frequency.

The wireless interface 303 is configured to receive, by using the receiver circuitry 303A, from the one or more positioning units 400, the one or more second positioning signals at the second frequency.

In one or more embodiments, the electronic device may be configured to activate the reception of one or more second positioning signals based on other information than a reception of an activation signal. The electronic device may periodically activate the reception of one or more second positioning signals. The electronic device may be equipped with or connected to one or more sensors, which information may be triggering an activation of a reception of a second positioning signal.

In one or more example electronic devices, the processor circuitry 302 may be configured to determine a second signal strength metric of at least one of the one or more second positioning signals.

In one or more example electronic devices, a second signal strength metric may comprise a received signal strength indicator, RSSI.

In one or more example electronic devices, the processor circuitry 302 may be configured to determine a third signal strength metric of at least one additional second positioning signal of the one or more second positioning signals.

In one or more example electronic devices, the processor circuitry 302 may be configured to compare the second signal strength metric and the third signal strength metric.

In one or more example electronic devices, the processor circuitry 302 may be configured to determine a second path loss estimate based on the second signal strength metric.

In one or more example electronic devices, the processor circuitry 302 may be configured to determine a third path loss estimate based on the third signal strength metric.

In one or more electronic devices, the processor circuitry 302 may be configured to determine a first signal strength metric of the one or more first positioning signals.

In one or more electronic devices, the processor circuitry 302 may be configured to compare the first signal strength metric and the second signal strength metric.

In one or more electronic devices, the processor circuitry 302 is configured to generate position data based on the comparison.

The electronic device 300 is optionally configured to perform any of the steps or operations disclosed in FIG. 4 (for example S302, S304, S306, S308, S310, S311, S312, S313, S314, S316, S318, S320, S322). The operations of the electronic device 300 may be embodied in the form of executable logic routines (for example, lines of code, software programs, etc.) that are stored on a non-transitory computer readable medium (for example, the memory circuitry 301) and are executed by the processor circuitry 302).

Furthermore, the operations of the electronic device 300 may be considered a method that the electronic device 300 is configured to carry out. Also, while the described functions and operations may be implemented in software, such functionality may as well be carried out via dedicated hardware or firmware, or some combination of hardware, firmware and/or software.

The memory circuitry 301 may be one or more of a buffer, a flash memory, a hard drive, a removable media, a volatile memory, a non-volatile memory, a random access memory (RAM), or other suitable device. In a typical arrangement, the memory circuitry 301 may include a non-volatile memory for long term data storage and a volatile memory that functions as system memory for the processor circuitry 302. The memory circuitry 301 may exchange data with the processor circuitry 302 over a data bus. Control lines and an address bus between the memory circuitry 301 and the processor circuitry 302 also may be present (not shown in FIG. 7). The memory circuitry 301 is considered a non-transitory computer readable medium.

Figure 8:
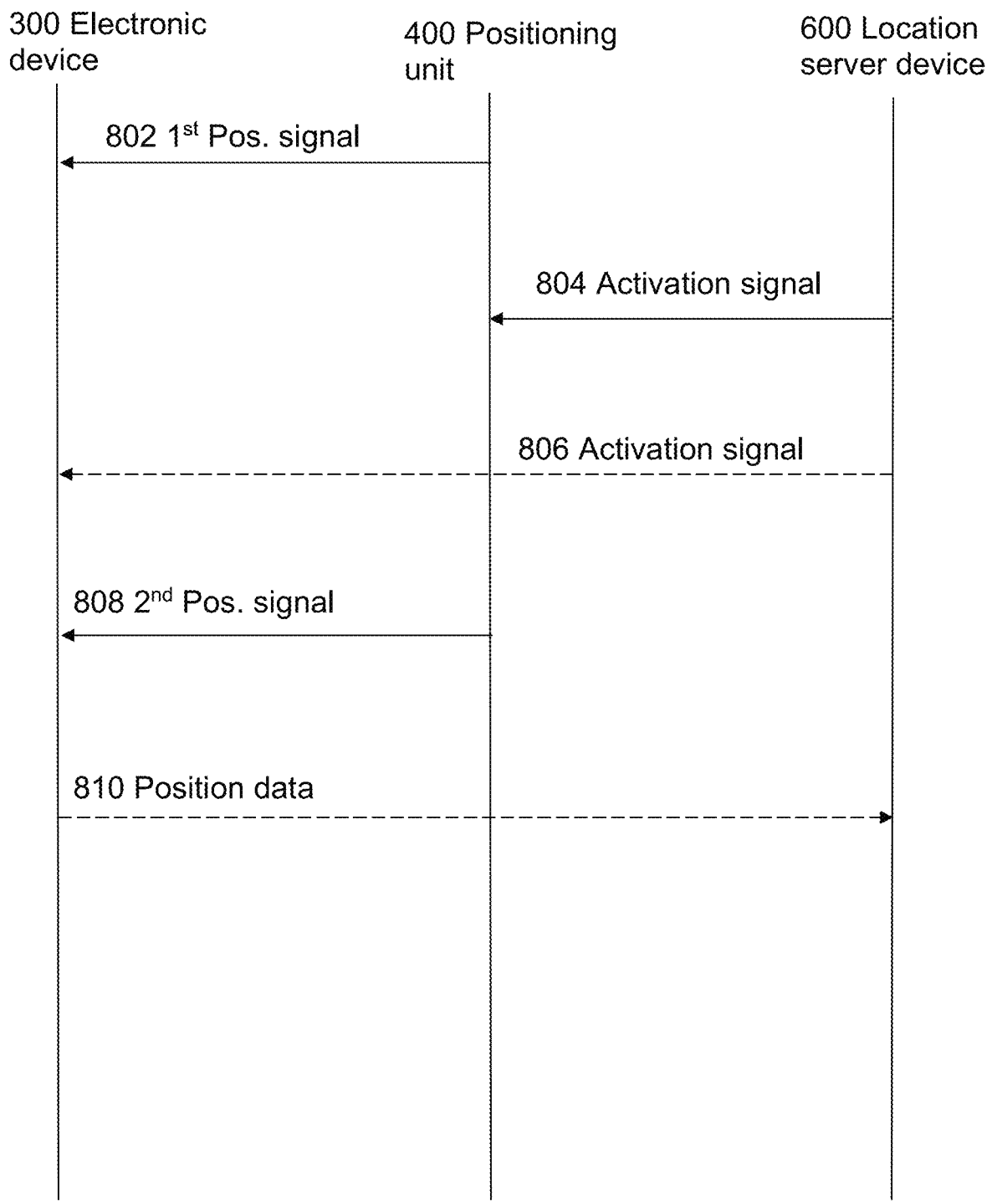
FIG. 8 is a signalling diagram illustrating an example signalling between an example electronic device, an example positioning unit, and an example location server device according to this disclosure.

FIG. 8 is a signalling diagram illustrating an example signalling between an example electronic device 300, an example positioning unit 400, and an example location server device 600 according to this disclosure. FIG. 8 illustrates a downlink-based localization of the electronic device.

In FIG. 8, the one or more positioning units 400 may be configured to communicate with one or more electronic devices 300, by transmitting one or more first positioning signals 802 at a first frequency (optionally of a first frequency band) to the one or more electronic devices 300. The electronic device 300 receives the first positioning signal 802.

The location server device 600 may be configured to communicate with the one or more positioning units 400 and with the one or more electronic devices 300.

Based on detecting a triggering event, the location server device 600 selects at least one of the one or more positioning units 400, for example in the vicinity of the electronic device 300 triggering the event. The location server device 600 transmits, to the at least one selected positioning unit 400, an activation signal 804. The location server device 600 may optionally transmit, to the electronic device 300 an activation signal 806.

The activation signal 804, transmitted to the at least one selected positioning unit 400, may indicate to the at least one selected positioning unit 400 to activate transmission of one or more second positioning signals 808 at a second frequency different from the first frequency (optionally of a second frequency band that is different from the first frequency band). The positioning unit 400 transmits the one or more second positioning signals 808 at a second frequency of a second frequency band that is different from the first frequency band The activation signal 806, transmitted to the electronic device 300, may indicate to the electronic device 300 to activate reception of the one or more second positioning signals 808.

The electronic device 300 may activate a receiver and receives the one or more second positioning signals 808.

The electronic device 300 may generate position data 810 (as described in step S320 of FIG. 4) and may transmit the position data 810 to the location server device 600.

Figure 9:
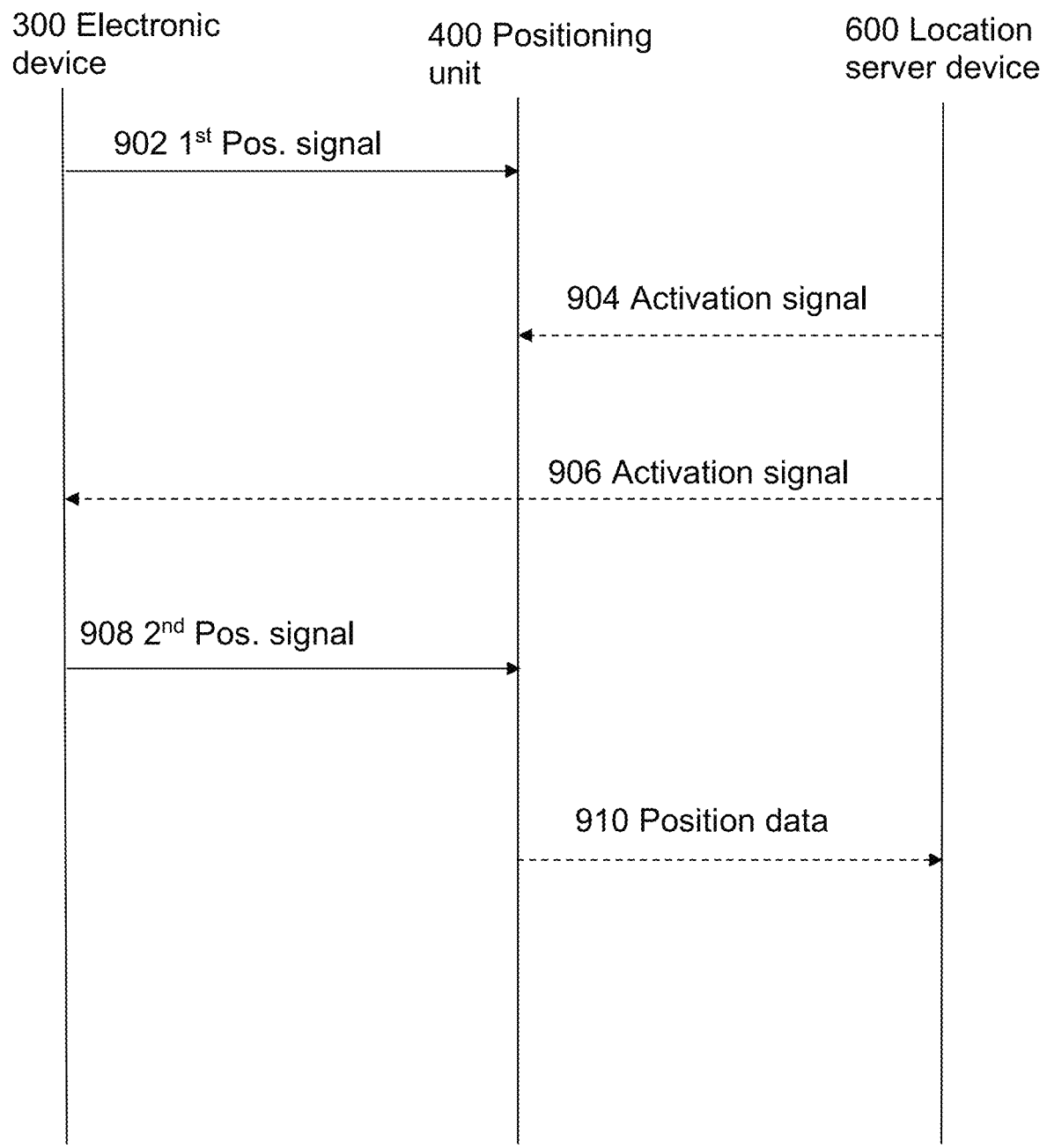
FIG. 9 is a signalling diagram illustrating an example signalling between an example electronic device, an example positioning unit, and an example location server device according to this disclosure.

FIG. 9 is a signalling diagram illustrating an example signalling between an example electronic device 300, an example positioning unit 400, and an example location server device 600 according to this disclosure. FIG. 9 illustrates an uplink-based localization.

In FIG. 9, the one or more electronic devices 300 transmits one or more first positioning signals 902 at a first frequency to the one or more positioning units 400.

In one or more uplink-based localization embodiments, the electronic device 300 is configured to transmit one or more first positioning signals 902 at a first frequency (optionally of a first frequency band) to the one or more positioning units 400.

In one or more uplink-based localization embodiments, the positioning unit 400 is configured to detect an activation trigger, wherein the activation trigger indicates to the positioning unit to activate reception of one or more second positioning signals and the positioning unit 400 is configured to transmit, to the electronic device, the one or more second positioning signals at a second frequency different from the first frequency (optionally the second frequency of a second frequency band that is different from the first frequency band).

In one or more uplink-based localization embodiments, the positioning unit 400 is configured to detect an activation trigger, wherein the activation trigger indicates to the positioning unit to activate reception (e.g. receiver 403B of FIG. 6) of one or more second positioning signals and the positioning unit 400 is configured to transmit, to the electronic device, the one or more second positioning signals at a second frequency (optionally of a second frequency band that is different from the first frequency band).

In one or more uplink-based localization embodiments, the positioning unit 400 is configured to receive the one or more first positioning signals 902.

The location server device 600 may be configured to communicate with the one or more positioning units 400 and with the one or more electronic devices 300.

Based on detecting a triggering event, the location server device 600 may select at least one of the one or more positioning units 400, for example in the vicinity of the electronic device 300 triggering the event. The location server device 600 may be configured to transmit, to the at least one selected positioning unit 400, an activation signal 904. The location server device 600 may be configured to transmit, to the electronic device 300, an activation signal 906.

In one or more uplink-based localization embodiment, the positioning unit 400 may be configured to detect the activation trigger by receiving an activation signal 904 from the location server device. The activation signal 904, transmitted to the at least one selected positioning unit 400, indicates to the at least one selected positioning unit 400 to activate reception of one or more second positioning signals 908 at a second frequency that is different from the first frequency. The second frequency may be of a second frequency band that is different from the first frequency band.

In one or more uplink-based localization embodiments, the electronic device is configured to activate a transmitter circuitry (e.g. transmitter circuitry 303B of FIG. 7) of the wireless interface for transmission of the one or more second positioning signals at the second frequency and to transmit, to the positioning unit 400, the one or more second positioning signals at the second frequency. The transmission may be activated by the reception of an activation signal 906 which indicates to the electronic device 300 to transmit the one or more second positioning signals 908 to the selected positioning unit 400.

The transmission may be activated periodically. The transmission may be activated based on the positioning measurement not satisfying an accuracy criterion.

In one or more uplink-based localization embodiments, the positioning unit 400 may be configured to generate position data 910 of the electronic device 300 and/or of the positioning unit 400 and to transmit the position data 910 to the location server device 600. The position data 910 may be indicative of one or more path loss estimates of the one or more second positioning signals received at the positioning unit and/or one or more signal strength metrics of the one or more second positioning signals received at the positioning unit.

For example, there may be multiple mathematical functions which can be used to generate the position data (such as to estimate the location of the positioning unit 400 and/or of the electronic device) and suitable functions may depend on the electronic device configurations. For example, the signal strength metric of a first positioning signal and the signal strength metric of a second positioning signal may be used to generate position data as disclosed herein. One or more advanced mathematical formulas may be used to estimate for example the distance between the positioning units and the electronic device based on the absolute values of the RSSI. Further, path loss can be estimated even with different output powers from different positioning signals, by a compensation added to the signal strength metrics. The calculations may be performed for example within the positioning unit and/or further the RSSI(s) transmitted to the location server device for position estimation.

Embodiments of methods and products (location server device, positioning unit, and electronic device) according to the disclosure are set out in the following items:

Item 1. A location server device comprising a memory circuitry, a processor circuitry, and an interface, wherein the location server device is configured to communicate, via the interface, with one or more positioning units configured to communicate with one or more electronic devices one or more first positioning signals at a first frequency,
    wherein the processor circuitry is configured to select at least one of the one or more positioning units based on detecting a trigger event; and
    wherein the interface is configured to transmit, to the at least one selected positioning unit, an activation signal, wherein the activation signal indicates to the at least one selected positioning unit to activate transmission of one or more second positioning signals at a second frequency that is different.

Item 2. The location server device according to item 1, wherein the second frequency is higher than the first frequency.

Item 3. The location server device according to any of the previous items, wherein detecting the trigger event comprises receiving from a sensor, sensor data indicative of presence information and/or movement information within proximity of at least one of the selected positioning units.

Item 4. The location server device according to any of the previous items, wherein the interface is configured to receive, from the electronic device, position data, the position data indicative of one or more path loss estimates of the one or more second positioning signals received at the electronic device and/or one or more signal strength metrics of the one or more second positioning signals received at the electronic device; and
    wherein the processor circuitry is configured to estimate a localization of the electronic device based on the received position data.

Item 5. The location server device according to the previous items, wherein detecting the trigger event comprises detecting that an accuracy parameter of an estimated localization does not satisfy an accuracy criterion based on a threshold.

Item 6. The location server device according to any of the previous items, wherein the processor circuitry is configured to transmit, via the interface, to the one or more positioning units, additional configuration data for adjusting transmission of the one or more second positioning signals at the one or more positioning units.

Item 7. The location server device according to any of the previous items, wherein the processor circuitry is configured to select at least one of the one or more positioning units based on detecting a trigger event by selecting at least one of the one or more positioning units based on information from the at least one of the one or more sensors.

Item 8. The location server device according to any of the previous items, wherein the interface is configured to:
    transmit a deactivation signal to the at least one selected positioning unit, wherein the deactivation signal indicates to the at least one selected positioning unit to deactivate the transmission of the one or more second positioning signals.

Item 9. The location server device according to any of the previous items, wherein the second frequency is in a frequency range above 3 GHz.

Item 10. The location server device according to any of the previous items, wherein the activation signal comprises configuration data for configuring transmission of the one or more second positioning signals at the one or more positioning units.

Item 11. The location server device according to any of the previous items, wherein the interface is configured to transmit, to the electronic device, the activation signal.

Item 12. A positioning unit comprising a memory circuitry, a processor circuitry, and an interface (403, wherein the positioning unit is configured to communicate with a location server device, and with an electronic device,
 wherein the interface is configured to transmit, to the electronic device, one or more first positioning signals at a first frequency;
 wherein the interface is configured to detect an activation trigger, wherein the activation trigger indicates to the positioning unit to activate transmission of one or more second positioning signals; and
 wherein the interface is configured to transmit, to the electronic device, the one or more second positioning signals at a second frequency of a second frequency that is different from the first frequency.

Item 13. The positioning unit according to item 12, wherein the interface is configured to detect the activation trigger by receiving an activation signal from the location server device.

Item 14. The positioning unit according to any of items 12-13, wherein the second frequency is higher than the first frequency.

Item 15. The positioning unit according to any of items 12-14, wherein the positioning unit is configured to transmit, to the electronic device, the one or more second positioning signals by:
 selecting one or more of transmission parameters comprising: a transmit frequency, a repetition periodicity of the transmission, a transmit power, and/or a time duration of the transmission; and
 transmitting the one or more second positioning signals according to the selected one or more transmission parameters.

Item 16. The positioning unit according to any of items 12-15, wherein the second positioning signal comprises a positioning unit identifier indicative of an identity of the positioning unit transmitting the second positioning signal.

Item 17. The positioning unit according to any of items 12-16, wherein the interface is configured to receive, from the location server device, a deactivation signal indicating to the selected positioning unit to deactivate the transmission of the one or more second positioning signals.

Item 18. The positioning unit according to item 17, wherein the positioning unit is configured to continue repetition of transmission of the second positioning signals until the deactivation signal is received at the positioning unit.

Item 19. The positioning unit according to any of items 12-18, wherein the interface is configured to receive, from the location server device, additional configuration data for adjusting transmission of the one or more second positioning signals at the one or more positioning units.

Item 20. An electronic device comprising a memory circuitry, a processor circuitry, and a wireless interface, wherein the electronic device is configured to communicate with one or more positioning units,
 wherein the wireless interface is configured to receive, from the one or more positioning units, one or more first positioning signals at a first frequency;
 wherein the processor circuitry is configured to activate a receiver circuitry (303A) of the wireless interface for reception of the one or more second positioning signals at a second frequency different from the first frequency; and
 wherein the wireless interface is configured to receive, from the one or more positioning units, the one or more second positioning signals at the second frequency.

Item 21. The electronic device according to item 20, wherein the wireless interface is configured to receive, from the location server device, an activation signal, wherein the activation signal indicates to the electronic device to activate reception of one or more second positioning signals at a second frequency of a second frequency that is different from the first frequency; and
 wherein the processor circuitry is configured to activate the receiver circuitry (303A) for reception of the one or more second positioning signals based on the received activation signal.

Item 22. The electronic device according to item 19, wherein the processor circuitry is configured to activate the receiver circuitry (303A) for reception of the one or more second positioning signals periodically.

Item 23. The electronic device according to item 20, wherein the processor circuitry is configured to:
 determine a second signal strength metric of at least one of the one or more second positioning signals.

Item 24. The electronic device according to any of items 20-23, wherein the processor circuitry is configured to:
 determine a third signal strength metric of at least one additional second positioning signal of the one or more second positioning signals; and
 compare the second signal strength metric and the third signal strength metric.

Item 25. The electronic device according to any of items 20-24, wherein the processor circuitry is configured to:
determine a second path loss estimate based on the second signal strength metric.

Item 26. The electronic device according to any of items 20-25, wherein the processor circuitry is configured to determine a third path loss estimate based on the third signal strength metric.

Item 27. The electronic device according to any of items 23-26, wherein the processor circuitry is configured to:
 determine a first signal strength metric of the one or more first positioning signals; and
 compare the first signal strength metric and the second signal strength metric.

Item 28. The electronic device according to item 27, wherein the processor circuitry is configured to generate position data based on the comparison.

Item 29. A method, performed at a location server device, for enabling localization of an electronic device, wherein the location server device is configured to communicate with one or more positioning units, wherein the one or more positioning units are configured to communicate, with one or more electronic devices, one or more first positioning signals at a first frequency, the method comprising:
 selecting at least one of the one or more positioning units based on detecting a triggering event; and
 transmitting, to the at least one selected positioning unit, an activation signal, wherein the activation signal indicates to the at least one selected positioning unit to activate transmission of one or more second positioning signals at a second frequency of a second frequency that is different from the first frequency.

Item 30. The method according to item 29, wherein the second frequency is higher than the first frequency.

Item 31. The method according to any of items 29-30, wherein detecting the trigger event comprises receiving from a sensor, sensor data indicative of presence and/or movement within proximity of at least one of the selected positioning units.

Item 32. The method according to any of items 29-31, the method comprising:
- receiving, from the electronic device, position data, the position data indicative of one or more path loss estimates of the one or more second positioning signals received at the electronic device and/or one or more signal strength metrics of the one or more second positioning signals received at the electronic device; and
- estimating a localization of the electronic device based on the received position data.

Item 33. The method according to any of items 29-32, wherein detecting the trigger event comprises detecting that an accuracy parameter of an estimated localization does not satisfy an accuracy criterion based on a threshold.

Item 34. The method according to any of items 29-33, wherein the method comprising transmitting to the one or more positioning units, additional configuration data for adjusting transmission of the one or more second positioning signals at the one or more positioning units.

Item 35. The method according to any of items 29-34, wherein selecting at least one of the one or more positioning units based on detecting a triggering event comprises selecting at least one of the one or more positioning units based on information from the at least one of the one or more sensor devices.

Item 36. The method according to any of items 29-35, the method comprising:
- transmitting a deactivation signal to the at least one selected positioning unit, wherein the deactivation signal indicates to the at least one selected positioning unit to deactivate the transmission of the one or more second positioning signals.

Item 37. The method according to any of items 29-36, wherein the second frequency is in a frequency range above 3 GHz.

Item 38. The method according to any of items 29-37, wherein the activation signal comprises configuration data for configuring transmission of the one or more second positioning signals at the one or more positioning units.

Item 39. The method according to any of items 29-38, wherein transmitting, to the at least one selected positioning unit, the activation signal comprises transmitting, to the electronic device, the activation signal.

Item 40. A method, performed at a positioning unit, for enabling localization of an electronic device, wherein the positioning unit is configured to communicate with a location server device, and with an electronic device, the method comprising:
- transmitting, to the electronic device, one or more first positioning signals at a first frequency;
- detecting (S204 an activation trigger, wherein the activation trigger indicates to the positioning unit to activate transmission of one or more second positioning signals; and
- transmitting, to the electronic device, the one or more second positioning signals at a second frequency that is different from the first frequency.

Item 41. The method according to item 40, wherein detecting the activation trigger comprises receiving, from the location server device, an activation signal.

Item 42. The method according to any of items 40-41, wherein detecting the activation trigger comprises receiving from a sensor, sensor data indicative of presence information within proximity of the positioning unit.

Item 43. The method according to any of items 40-42, wherein the second frequency is higher than the first frequency.

Item 44. The method according to any of items 40-43, wherein transmitting, to the electronic device, the one or more second positioning signals comprises:
- selecting one or more of transmission parameters comprising: a transmit frequency, a repetition periodicity of the transmission, a transmit power, and/or a time duration of the transmission; and
- transmitting the one or more second positioning signals according to the selected one or more transmission parameters.

Item 45. The method according to any of items 40-44, wherein the second positioning signal comprises a positioning unit identifier indicative of an identity of the positioning unit transmitting the second positioning signal.

Item 46. The method according to any of items 40-45, the method comprising receiving, from the location server device, a deactivation signal indicating to the selected positioning unit to deactivate the transmission of the one or more second positioning signals.

Item 47. The method according to item 46, the method comprising continuing repetition of transmission of the second positioning signals until the deactivation signal is received at the positioning unit.

Item 48. The method according to any of items 40-47, the method comprising receiving, from the location server device, additional configuration data for adjusting transmission of the one or more second positioning signals at the one or more positioning units.

Item 49. A method, performed at an electronic device, for localization of the electronic device, wherein the electronic device is configured to communicate with one or more positioning units, and with a location server device, the method comprising:
- receiving, from the one or more positioning units, one or more first positioning signals at a first frequency;
- activating a receiver of the electronic device for reception of the one or more second positioning signals at a second frequency different from the first frequency; and
- receiving, from the one or more positioning units, the one or more second positioning signals at the second frequency.

Item 50. The method according to item 49, the method comprising receiving, from the location server device, an activation signal, wherein the activation signal indicates to the electronic device to activate reception of one or more second positioning signals at a second frequency that is different from the first frequency.

Item 51. The method according to any of items 49-50, the method comprising:
- determining a second signal strength metric of at least one of the one or more second positioning signals.

Item 52. The method according to any of items 49-51, the method comprising:
   determining a third signal strength metric of at least one additional second positioning signal of the one or more second positioning signals; and
   comparing the second signal strength metric and the third signal strength metric.

Item 53. The method according to any of items 49-52, the method comprising: determining a second path loss estimate based on the second signal strength metric.

Item 54. The method according to any of items 49-53, the method comprising determining a third path loss estimate based on the third signal strength metric.

Item 55. The method according to any of items 49-54, the method comprising:
   determining a first signal strength metric of the one or more first positioning signals; and
   comparing the first signal strength metric and the second signal strength metric.

Item 56. The method according to any of items 49-55, the method comprising generating position data based on the comparison.

Item 57. A computer readable storage medium storing one or more programs, the one or more programs comprising instructions, which when executed by a location server device cause the location server device to perform the methods of any of items 29-39.

Item 52. A computer readable storage medium storing one or more programs, the one or more programs comprising instructions, which when executed by a positioning unit cause the positioning unit to perform the methods of any of items 40-48.

Item 53. A computer readable storage medium storing one or more programs, the one or more programs comprising instructions, which when executed by an electronic device cause the electronic device to perform the methods of any of items 49-56.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1A-9 comprises some circuitries or steps or operations which are illustrated with a solid line and some circuitries or operations which are illustrated with a dashed line. The circuitries or steps or operations which are comprised in a solid line are circuitries or operations which are comprised in the broadest example embodiment. The circuitries or steps or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the example embodiments may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed subject matter, and it will be made obvious to those skilled in the art that various changes and modifications may be made without departing from the scope of the claimed subject matter. The specification and drawings are, accordingly to be regarded in an illustrative rather than restrictive sense. The claimed subject matter is intended to cover all alternatives, modifications, and equivalents.

The invention claimed is:

1. A location server device comprising a memory circuitry, a processor circuitry, and an interface, wherein the location server device is configured to communicate, via the interface, with one or more positioning units configured to communicate to one or more electronic devices one or more first positioning signals at a first frequency,
   wherein the processor circuitry is configured to select at least one of the one or more positioning units based on detecting a trigger event; and
   wherein the interface is configured to transmit, to the at least one selected positioning unit, an activation signal, wherein the activation signal indicates to the at least one selected positioning unit to activate transmission of one or more second positioning signals to the one or more electronic devices at a second frequency that is different from the first frequency.

2. The location server device according to claim 1, wherein the second frequency is higher than the first frequency.

3. The location server device according to claim 1, wherein detecting the trigger event comprises receiving from a sensor, sensor data indicative of presence information within proximity of at least one of the selected positioning units.

4. The location server device according to claim 1, wherein the interface is configured to receive, from the electronic device, position data, the position data indicative of one or more path loss estimates of the one or more second positioning signals received at the electronic device and/or one or more signal strength metrics of the one or more second positioning signals received at the electronic device; and
wherein the processor circuitry is configured to estimate a localization of the electronic device based on the received position data.

5. The location server device according to claim 1, wherein detecting the trigger event comprises detecting that an accuracy parameter of an estimated localization does not satisfy an accuracy criterion based on a threshold.

6. The location server device according to claim 1, wherein the second frequency is in a frequency range above 3 GHz.

7. A positioning unit comprising a memory circuitry, a processor circuitry, and an interface, wherein the positioning unit is configured to communicate with a location server device, and with an electronic device,
wherein the interface is configured to transmit, to the electronic device, one or more first positioning signals at a first frequency;
wherein the interface is configured to detect an activation trigger, wherein the activation trigger indicates to the positioning unit to activate transmission of one or more second positioning signals; and
wherein the interface is configured to transmit, to the electronic device, the one or more second positioning signals at a second frequency that is different from the first frequency.

8. The positioning unit according to claim 7, wherein the interface is configured to detect the activation trigger by receiving an activation signal from the location server device.

9. The positioning unit according to claim 7, wherein the second frequency is higher than the first frequency.

10. The positioning unit according to claim 7, wherein the positioning unit is configured to transmit, to the electronic device, the one or more second positioning signals by:
selecting one or more of transmission parameters comprising: a transmit frequency, a repetition periodicity of the transmission, a transmit power, and/or a time duration of the transmission; and
transmitting the one or more second positioning signals according to the selected one or more transmission parameters.

11. The positioning unit according to claim 7, wherein the second positioning signal comprises a positioning unit identifier indicative of an identity of the positioning unit transmitting the second positioning signal.

12. The positioning unit according to claim 7, wherein the interface is configured to receive, from the location server device, a deactivation signal indicating to the selected positioning unit to deactivate the transmission of the one or more second positioning signals.

13. The positioning unit according to claim 12, wherein the positioning unit is configured to continue repetition of transmission of the second positioning signals until the deactivation signal is received at the positioning unit.

14. The positioning unit according to claim 7, wherein the interface is configured to receive, from the location server device, additional configuration data for adjusting transmission of the one or more second positioning signals at the one or more positioning units.

15. An electronic device comprising a memory circuitry, a processor circuitry, and a wireless interface, wherein the electronic device is configured to communicate with one or more positioning units,
wherein the wireless interface is configured to receive, from the one or more positioning units, one or more first positioning signals at a first frequency;
wherein the processor circuitry is configured to activate a receiver circuitry of the wireless interface for reception of the one or more second positioning signals at a second frequency different from the first frequency; and
wherein the wireless interface is configured to receive, from the one or more positioning units, the one or more second positioning signals at the second frequency.

16. The electronic device according to claim 15, wherein the wireless interface is configured to receive, from the location server device, an activation signal, wherein the activation signal indicates to the electronic device to activate reception of one or more second positioning signals at the second frequency that is different from the first frequency; and
wherein the processor circuitry is configured to activate the receiver circuitry for reception of the one or more second positioning signals based on the received activation signal.

17. The electronic device according to claim 15, wherein the processor circuitry is configured to:
determine a second signal strength metric of at least one of the one or more second positioning signals.

18. The electronic device according to claim 15, wherein the processor circuitry is configured to:
determine a third signal strength metric of at least one additional second positioning signal of the one or more second positioning signals; and
compare the second signal strength metric and the third signal strength metric.

* * * * *